US011460303B2

(12) United States Patent
Ueno et al.

(10) Patent No.: US 11,460,303 B2
(45) Date of Patent: Oct. 4, 2022

(54) ELECTRONIC APPARATUS, CONTROL DEVICE, AND OPERATION METHOD OF ELECTRONIC APPARATUS

(71) Applicant: KYOCERA Corporation, Kyoto (JP)

(72) Inventors: Yasuhiro Ueno, Yokohama (JP); Shigeki Tanabe, Yokohama (JP); Hideki Morita, Yokohama (JP); Isao Masuike, Machida (JP); Koutaro Yamauchi, Yokohama (JP); Manabu Sakuma, Yokohama (JP); Kenji Shimada, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 724 days.

(21) Appl. No.: 16/418,666

(22) Filed: May 21, 2019

(65) Prior Publication Data
US 2019/0271546 A1  Sep. 5, 2019

Related U.S. Application Data

(63) Continuation of application No. PCT/JP2017/040518, filed on Nov. 10, 2017.

(30) Foreign Application Priority Data

Nov. 25, 2016 (JP) .............................. JP2016-229120
Mar. 23, 2017 (JP) .............................. JP2017-058103

(51) Int. Cl.
*G01C 21/20* (2006.01)
*G01S 5/02* (2010.01)
(Continued)

(52) U.S. Cl.
CPC ............... *G01C 21/20* (2013.01); *G01S 5/02* (2013.01); *G01S 5/0252* (2013.01); *G01S 19/13* (2013.01);
(Continued)

(58) Field of Classification Search
CPC ......... G01C 21/20; G01S 5/02; G01S 5/0252; G01S 19/13; G05B 19/042;
(Continued)

(56) References Cited

U.S. PATENT DOCUMENTS 6,233,448 B1    5/2001  Alperovich et al.
2009/0199291 A1  8/2009  Hayasaka et al.
(Continued)

FOREIGN PATENT DOCUMENTS

CN    101515172 A    8/2009
CN    105488954 A    4/2016
(Continued)

OTHER PUBLICATIONS

Anonymous; "Service set (802.11 network)—Wikipedia"; Nov. 3, 2016; total 3 pages; XP055690399; URL: https://en.wikipedia.org/w/index.php?title=Service_set_(802.11_network)&oldid=747645525 [retrieved on Apr. 29, 2020].
(Continued)

*Primary Examiner* — Brian P Sweeney
(74) *Attorney, Agent, or Firm* — Studebaker & Brackett PC

(57) ABSTRACT

An electronic apparatus includes a communication unit configured to perform wireless communication, a storage, a first determiner, and an indoor specifying unit. The storage stores therein, as registered identification information, identification information whose contents are changeable, the identification information being allocated to a first communication device with which the communication unit is capable of performing wireless communication. The first determiner determines whether received identification information agrees with the registered identification information, the received identification information being the identification information received by the communication unit from a
(Continued)

second communication device and allocated to the second communication device. The indoor specifying unit performs indoor specification to specify that a user having the electronic apparatus is indoors, based on a first result of determination by the first determiner.

19 Claims, 31 Drawing Sheets

(51) Int. Cl.
| | |
|---|---|
| G01S 19/13 | (2010.01) |
| H04B 1/3822 | (2015.01) |
| H04M 1/725 | (2021.01) |
| H04W 4/48 | (2018.01) |
| H04W 4/02 | (2018.01) |
| G05B 19/042 | (2006.01) |
| H04W 64/00 | (2009.01) |
| H04W 4/33 | (2018.01) |
| H04M 1/72412 | (2021.01) |
| H04M 1/72454 | (2021.01) |
| H04W 84/12 | (2009.01) |
| H04W 88/06 | (2009.01) |

(52) U.S. Cl.
CPC ......... *G05B 19/042* (2013.01); *H04B 1/3822* (2013.01); *H04M 1/72412* (2021.01); *H04M 1/72454* (2021.01); *H04W 4/027* (2013.01); *H04W 4/33* (2018.02); *H04W 4/48* (2018.02); *H04W 64/00* (2013.01); *G05B 2219/37* (2013.01); *H04W 84/12* (2013.01); *H04W 88/06* (2013.01)

(58) Field of Classification Search
CPC ............. G05B 2219/37; H04B 1/3822; H04M 1/72412; H04M 1/72454; H04W 4/027; H04W 4/33; H04W 4/48; H04W 64/00; H04W 84/12; H04W 88/06
See application file for complete search history.

(56) References Cited

U.S. PATENT DOCUMENTS

| | | |
|---|---|---|
| 2012/0157128 A1 | 6/2012 | Aust et al. |
| 2012/0252495 A1 | 10/2012 | Moeglein et al. |
| 2013/0137450 A1 | 5/2013 | Dai et al. |
| 2014/0179298 A1 | 6/2014 | Grokop et al. |
| 2014/0274114 A1* | 9/2014 | Rowitch ................. H04W 4/33 455/456.1 |
| 2014/0341061 A1 | 11/2014 | Shinada et al. |
| 2015/0153437 A1 | 6/2015 | Baumgartner et al. |
| 2015/0220817 A1 | 8/2015 | Kujirai |
| 2015/0247917 A1 | 9/2015 | Gum et al. |
| 2016/0080911 A1 | 3/2016 | Kay et al. |
| 2016/0165396 A1 | 6/2016 | Wirola et al. |
| 2016/0198431 A1 | 7/2016 | Pattabiraman et al. |
| 2016/0306338 A1 | 10/2016 | Morita |
| 2017/0150490 A1 | 5/2017 | Chen et al. |

FOREIGN PATENT DOCUMENTS

| | | |
|---|---|---|
| CN | 105549717 A | 5/2016 |
| EP | 2327995 A2 | 6/2011 |
| EP | 2680039 A1 | 1/2014 |
| JP | 2003258942 A | 9/2003 |
| JP | 2009188771 A | 8/2009 |
| JP | 2010250680 A | 11/2010 |
| JP | 2011049931 A | 3/2011 |
| JP | 2014508285 A | 4/2014 |
| JP | 2014123847 A | 7/2014 |
| JP | 2015148847 A | 8/2015 |
| JP | 2016005228 A | 1/2016 |
| JP | 2016506668 A | 3/2016 |
| JP | 2016519756 A | 7/2016 |
| JP | 2016-163186 A | 9/2016 |
| JP | 2016158118 A | 9/2016 |
| WO | 2013128613 A1 | 9/2013 |
| WO | 2015064662 A1 | 5/2015 |

OTHER PUBLICATIONS

Qualcomm Incorporated, "Updates to Vulnerable Road User (VRU) use cases", 3GPP TSG-SA WG1 Meeting #72, S1-154434, Nov. 16-20, 2015, pp. 1-7, Anaheim, CA, USA.

* cited by examiner

F I G. 3
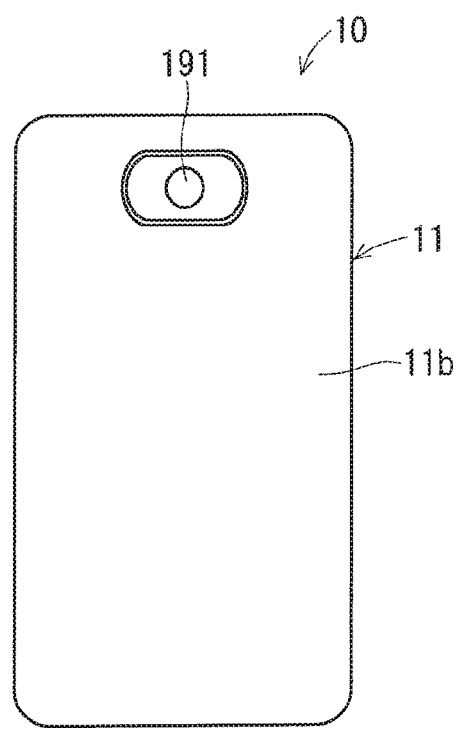

F I G . 7
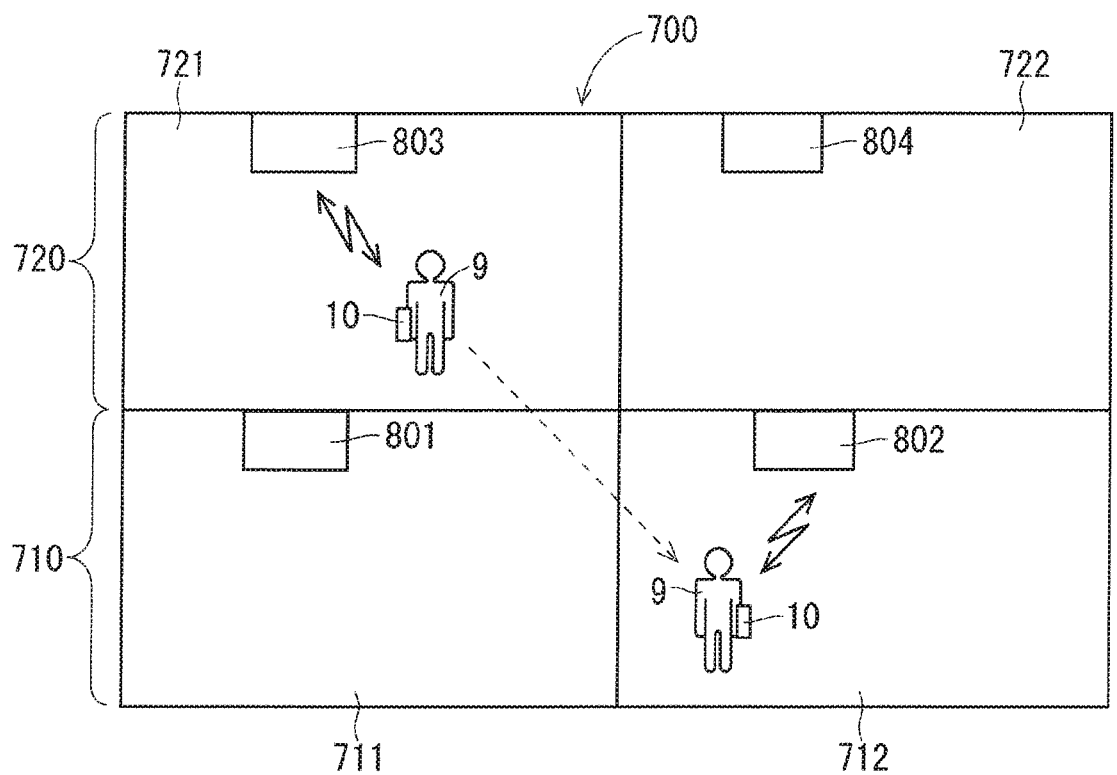

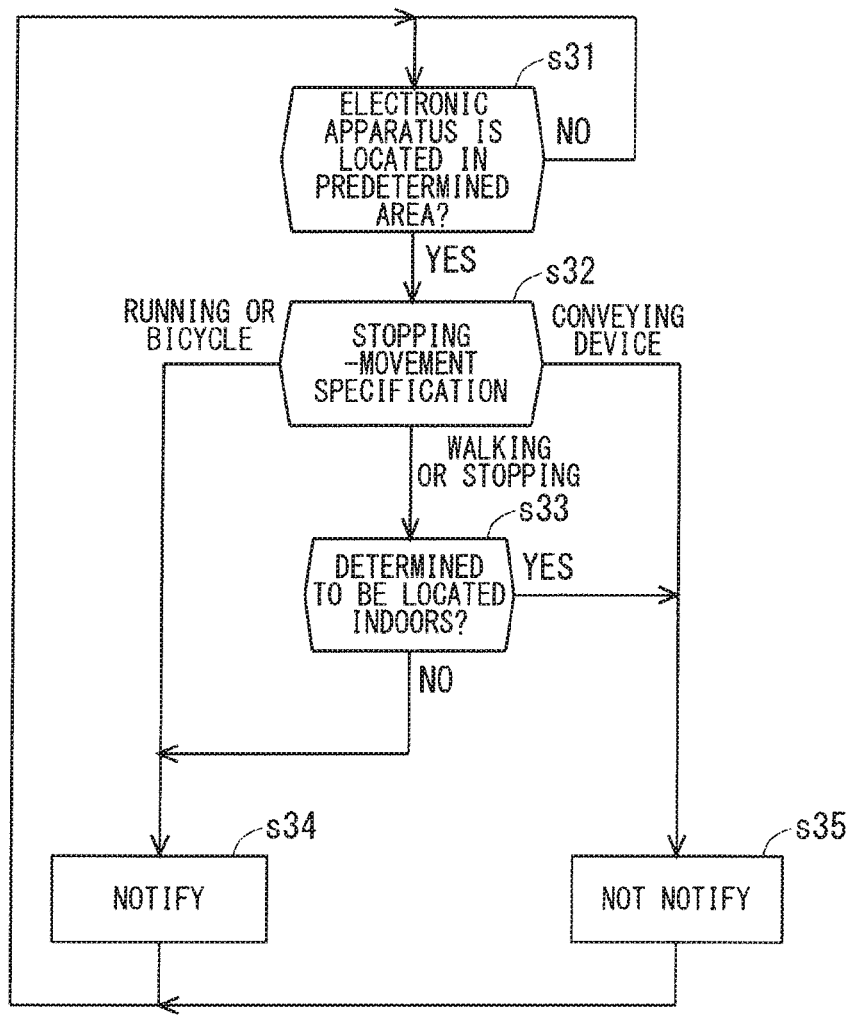
F I G . 1 2

F I G . 1 4
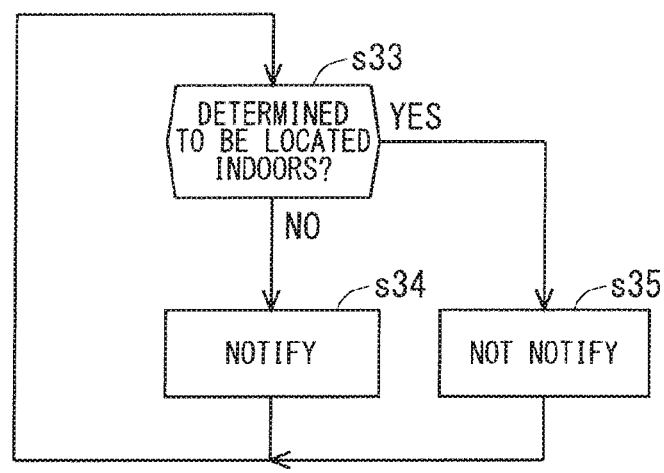

ELECTRONIC APPARATUS, CONTROL DEVICE, AND OPERATION METHOD OF ELECTRONIC APPARATUS

CROSS-REFERENCE TO RELATED APPLICATION

The present application is a continuation based on PCT Application No. PCT/JP2017/040518 filed on Nov. 10, 2017, which claims the benefit of Japanese Application No. 2016-229120, filed on Nov. 25, 2016 and Japanese Application No. 2017-058103, filed on Mar. 23, 2017. PCT Application No. PCT/JP2017/040518 is entitled "ELECTRONIC DEVICE, CONTROL DEVICE, CONTROL PROGRAM, AND OPERATION METHOD OF ELECTRONIC DEVICE", Japanese Application No. 2016-229120 is entitled "ELECTRONIC APPARATUS, CONTROL DEVICE, CONTROL PROGRAM, AND OPERATION METHOD OF ELECTRONIC APPARATUS", and Japanese Application No. 2017-058103 is entitled "ELECTRONIC APPARATUS, CONTROL DEVICE, CONTROL PROGRAM, AND OPERATION METHOD OF ELECTRONIC APPARATUS". The contents of which are incorporated by reference herein in their entirety.

FIELD

The present disclosure relates to an electronic apparatus.

BACKGROUND

Various techniques have been proposed for electronic apparatuses.

SUMMARY

There are disclosed an electronic apparatus, a control device, and computer-readable non-transitory recording medium, and an operation method of an electronic apparatus. According to an embodiment, an electronic apparatus includes a communication unit configured to perform wireless communication, a storage, and at least one processor. The storage stores therein, as registered identification information, identification information whose contents are changeable, the identification information being allocated to a first communication device with which the communication unit is capable of performing wireless communication. The at least one processor performs determination processing of determining whether received identification information agrees with the registered identification information, the received identification information being the identification information received by the communication unit from a second communication device and allocated to the second communication device. The at least one processor performs indoor specification to specify that a user having the electronic apparatus is indoors, based on a first result of determination by the determination processing.

According to an embodiment, a control device is a control device of an electronic apparatus for performing wireless communication, the control device being configured to control operation of the electronic apparatus. The control device includes at least one processor. The at least one processor performs determination processing of determining whether registered identification information agrees with received identification information. The registered identification information is identification information whose contents are changeable, the identification information being registered in the electronic apparatus and allocated to a first communication device with which the electronic apparatus is capable of performing wireless communication. The received identification information is the identification information received by the electronic apparatus from a second communication device through wireless communication and allocated to the second communication device. The at least one processor performs indoor specification to specify that a user having the electronic apparatus is indoors, based on a result of determination by the determination processing.

According to an embodiment, a computer-readable non-transitory recording medium stores a control program for controlling an electronic apparatus configured to perform wireless communication. The control program causes the electronic apparatus to execute determination processing and indoor specification. The determination processing includes determining whether registered identification information agrees with received identification information. The registered identification information is identification information whose contents are changeable, the identification information being registered in the electronic apparatus and allocated to a first communication device with which the electronic apparatus is capable of performing wireless communication. The received identification information is the identification information received by the electronic apparatus from a second communication device through wireless communication and allocated to the second communication device. The indoor specification includes specifying that a user having the electronic apparatus is indoors, based on a result of determination in the determination processing.

According to an embodiment, an operation method of an electronic apparatus is an operation method of an electronic apparatus configured to perform wireless communication. The operation method includes determination processing and indoor specification. The determination processing includes determining whether registered identification information agrees with received identification information. The registered identification information is identification information whose contents are changeable, the identification information being registered in the electronic apparatus and allocated to a first communication device with which the electronic apparatus is capable of performing wireless communication. The received identification information is the identification information received by the electronic apparatus from a second communication device through wireless communication and allocated to the second communication device. The indoor specification includes specifying that a user having the electronic apparatus is indoors, based on a result of determination in determination processing.

BRIEF DESCRIPTION OF THE DRAWINGS

FIG. 3 is a rear view illustrating one example of an appearance of the electronic apparatus.

FIG. 7 is a view illustrating one example of a state in which a user having the electronic apparatus is indoors.

FIG. 12 is a flowchart illustrating one example of operation of the electronic apparatus.

FIG. 14 is a flowchart illustrating one example of operation of the electronic apparatus.

DETAILED DESCRIPTION

Figure 1:
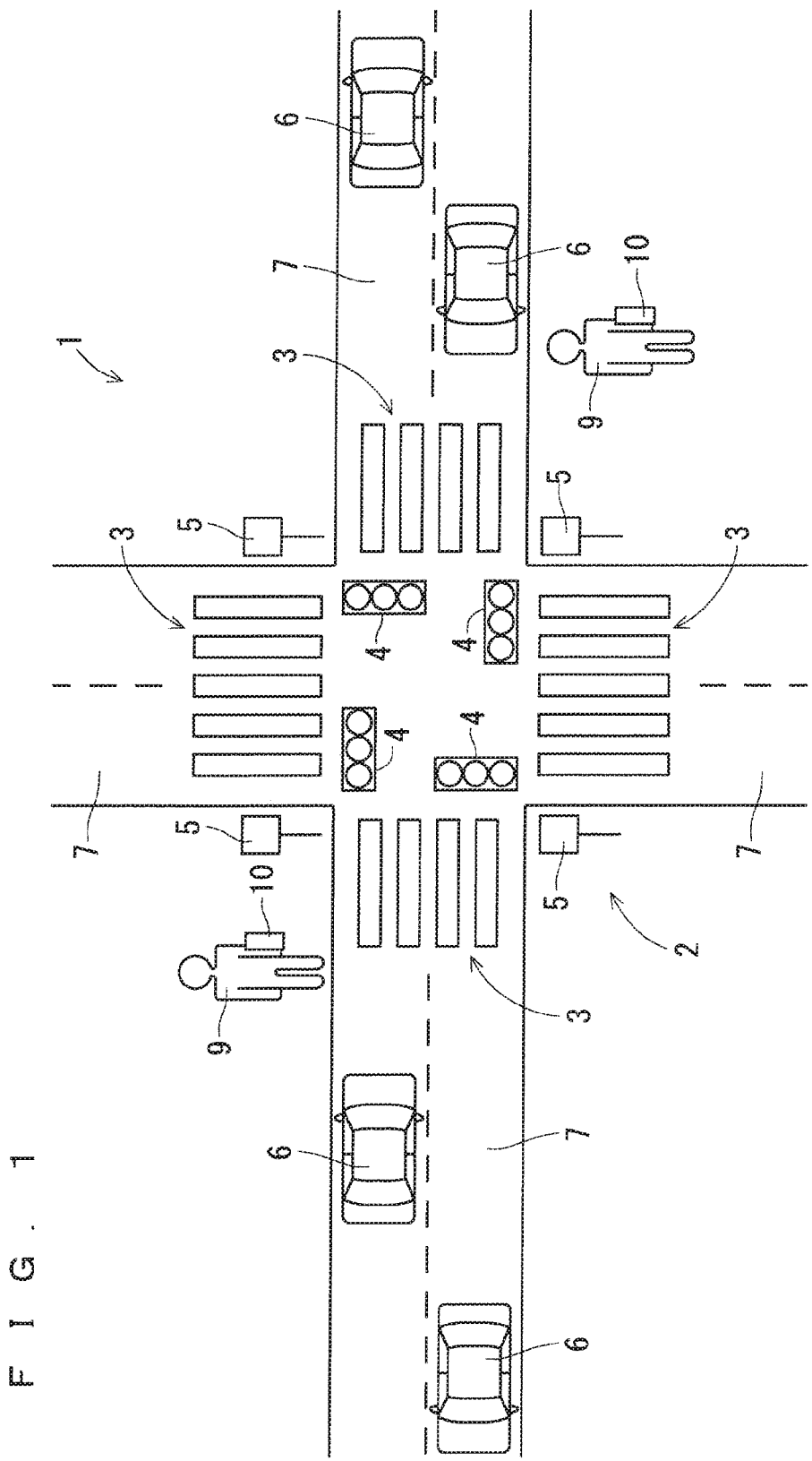
FIG. 1 is a view illustrating one example of a system in which an electronic apparatus is used.

FIG. 1 is a view illustrating one example of a system in which an electronic apparatus 10 is used. The electronic apparatus 10 is, for example, a mobile phone such as a smartphone. The electronic apparatus 10 can be used in, for example, intelligent transport systems (ITS). Specifically, the electronic apparatus 10 can be used in a safe driving support communication system 1 of the ITS. The safe driving support communication system 1 is called a safe driving support system or is called a safe driving support wireless system.

As illustrated in FIG. 1, in the safe driving support communication system 1, a roadside unit 5 disposed at, for example, a crossroad 2, a vehicle 6, such as an automobile, traveling a roadway 7, and an electronic apparatus 10 carried by a user 9 who is a pedestrian are capable of performing mutual wireless communication. This allows the roadside unit 5, the vehicle 6, and the electronic apparatus 10 to exchange information with one another. In addition, a plurality of vehicles 6 are capable of performing mutual wireless communication. This allows the plurality of vehicles 6 to exchange information with one another. Communication between a roadside unit 5 and a vehicle 6, communication between vehicles 6, communication between a roadside unit 5 and an electronic apparatus 10 of a pedestrian, and communication between an electronic apparatus 10 of a pedestrian and a vehicle 6 are respectively called roadside-to-vehicle communication, vehicle-to-vehicle communication, roadside-to-pedestrian communication, and pedestrian-to-vehicle communication.

A roadside unit 5 is capable of notifying a vehicle 6 and an electronic apparatus 10 of, for example, information on lighting of a traffic signal 4, information on traffic control, and the like. The roadside unit 5 is also capable of detecting a nearby vehicle 6 and a nearby pedestrian. The roadside unit 5 disposed at a crossroad 2 is capable of detecting, for example, a pedestrian crossing a crosswalk 3. The roadside unit 5 is then capable of notifying the vehicle 6 and the electronic apparatus 10 of information on the detected vehicle 6 and information on the detected pedestrian. The roadside unit 5 is also capable of notifying other vehicles 6 and other electronic apparatuses 10 of information sent from the vehicle 6 and information sent from the electronic apparatus 10.

A vehicle 6 is capable of notifying other vehicles 6, a roadside unit 5, and an electronic apparatus 10 of information on its turning direction, its position, its speed, and the like. The vehicle 6 is capable of providing various notifications such as an alarm to a driver, based on received information, thereby supporting safe driving by a driver. The vehicle 6 is capable of providing the various notifications to the driver, using a speaker, a display device, and the like. The vehicle 6 is capable of providing the various notifications to the driver, using, for example, a car navigation system installed in the vehicle 6.

An electronic apparatus 10 is capable of specifying a state of a user 9 having the electronic apparatus 10. The electronic apparatus 10 is capable of notifying a roadside unit 5 and the like of, for example, information on the specified state of the user 9. The operation of the electronic apparatus 10 will be described in detail later.

As described above, the safe driving support communication system 1 performs roadside-to-vehicle communication, vehicle-to-vehicle communication, roadside-to-pedestrian communication, and pedestrian-to-vehicle communication, thereby supporting safe driving by a driver of a vehicle 6.

It should be noted that an automobile is illustrated as one example of a vehicle 6 in FIG. 1; however, a vehicle 6 may be any vehicle in addition to an automobile. Examples of the vehicle 6 may include a bus and a tramcar. In addition, an electronic apparatus 10 can be used in any system in addition to the safe driving support communication system 1.

<One Example of External Appearance of Electronic Apparatus>

Figure 2:
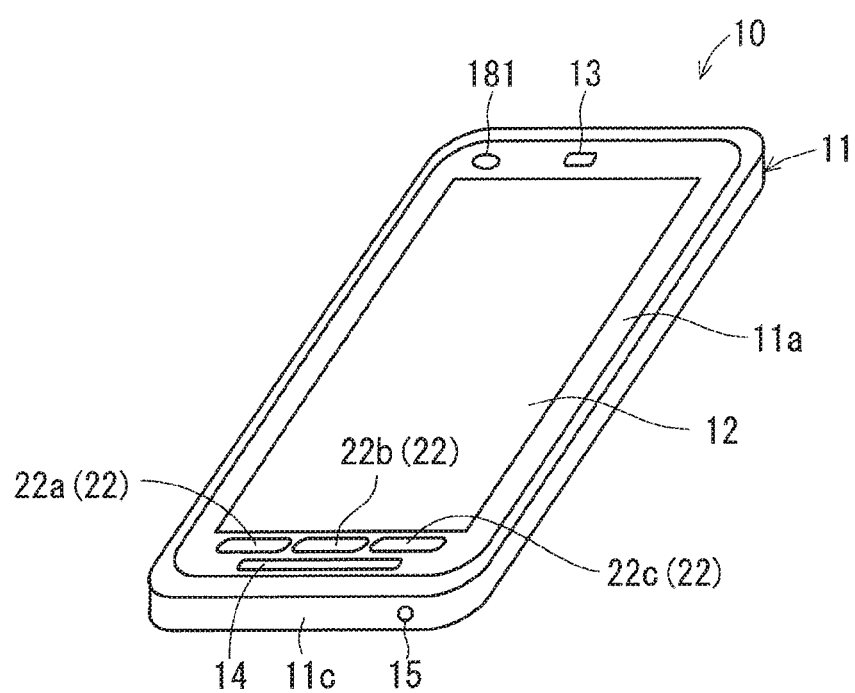
FIG. 2 is a perspective view illustrating one example of an appearance of the electronic apparatus.

FIGS. 2 and 3 are a perspective view and a rear view showing one example of an external appearance of the electronic apparatus 10, respectively. As illustrated in FIGS. 2 and 3, the electronic apparatus 10 comprises an apparatus case 11 having a plate shape substantially rectangular in a plan view. The apparatus case 11 constitutes an exterior of the electronic apparatus 10.

A display region 12, in which various types of information such as characters, symbols, and graphics are displayed, is located in a front surface 11a of the apparatus case 11. A touch panel 130, which will be described below, is located in a rear surface side of the display region 12. Accordingly, the user 9 can input various types of information to the electronic apparatus 10 by operating the display region 12 in the front surface of the electronic apparatus 10 with his/her finger, for example. The user 9 can also input the various types of information to the electronic apparatus 10 by operating the display region 12 with a pen for the touch panel such as a stylus pen, for example, instead of an operator such as his/her finger.

A receiver hole 13 is located in an upper end of the front surface 11a of the apparatus case 11. A speaker hole 14 is located in a lower end of the front surface 11a. A microphone hole 15 is located in a side surface 11c in a lower side of the apparatus case 11.

A lens 181 included in a first camera 180, which will be described below, can be visually recognized from the upper end of the front surface 11a of the apparatus case 11. As illustrated in FIG. 3, a lens 191 included in a second camera 190, which will be described below, can be visually recognized from an upper end of a rear surface 11b of the apparatus case 11.

The electronic apparatus 10 comprises an operation button group 220 including a plurality of operation buttons 22 (refer to FIG. 4 described below). Each of the plurality of the operation buttons 22 is a hardware button, for example. Specifically, each of the plurality of the operation buttons 22 is a press button. At least one operation button 22 included in the operation button group 220 may also be a software button displayed in the display region 12.

The operation button group 220 includes an operation button 22a, an operation button 22b, and an operation button 22c located in the lower end of the front surface 11a of the apparatus case 11. The operation button group 220 includes a power button and a volume button located in a surface of the apparatus case 11.

The operation button 22a is a back button, for example. The back button is an operation button for switching a display in the display region 12 to an immediately preceding display. The user 9 operates the operation button 22a to switch the display in the display region 12 to the immediately preceding display. The operation button 22b is a home button, for example. The home button is an operation button for displaying a home screen in the display region 12. The user 9 operates the operation button 22b to display the home screen in the display region 12. The operation button 22c is a history button, for example. The history button is an operation button to display a history of an application executed by the electronic apparatus 10 in the display region 12. When the user 9 operates the operation button 22c, the history of the application executed by the electronic apparatus 10 is displayed in the display region 12.

<One Example of Electrical Configuration of Electronic Apparatus>

Figure 4:
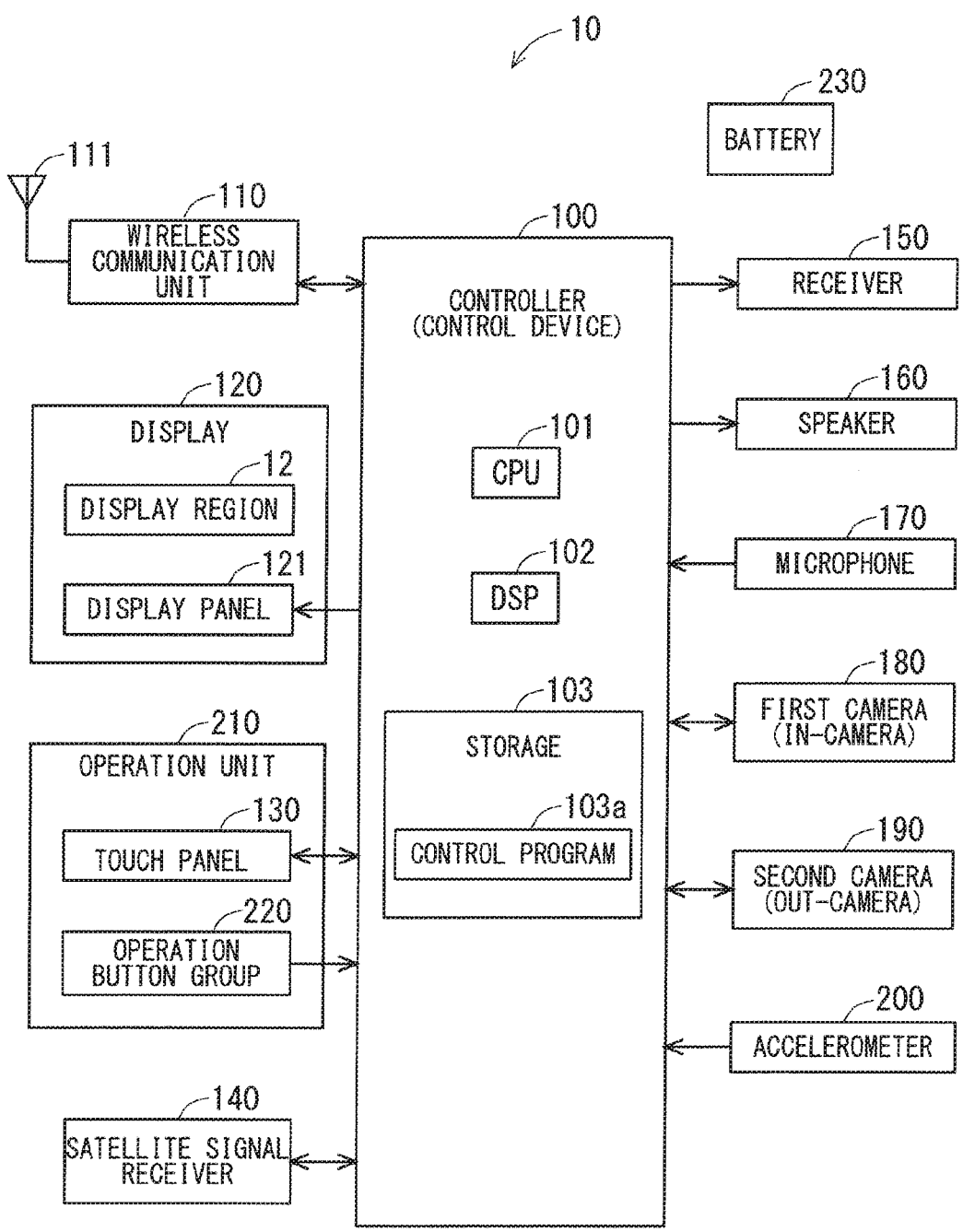
FIG. 4 is a block diagram illustrating one example of a configuration of the electronic apparatus.

FIG. 4 is a block diagram mainly showing one example of an electrical configuration of the electronic apparatus 10. As illustrated in FIG. 4, the electronic apparatus 10 comprises a controller 100, a wireless communication unit 110, a display 120, an operation unit 210, and a satellite signal receiver 140. The electronic apparatus 10 further comprises a receiver 150, a speaker 160, a microphone 170, the first camera 180, the second camera 190, an accelerometer 200, and a battery 230. The apparatus case 11 houses these components included in the electronic apparatus 10.

The controller 100 controls the other components of an electronic apparatus 10 to be able to collectively manage the operation of the electronic apparatus 10. The controller 100 is also considered as a control device. The controller 100 includes at least one processor for providing control and processing capability to execute various functions as described in detail below.

In accordance with various embodiments, the at least one processor may be executed as a single integrated circuit (IC) or as multiple communicatively coupled IC's and/or discrete circuits. The at least one processor can be executed in accordance with various known techniques.

In one embodiment, the processor includes one or more circuits or units configurable to perform one or more data computing procedures or processes by executing instructions stored in an associated memory, for example. In the other embodiment, the processor may be firmware configurable to perform one or more data computing procedures or processes (a discrete logic component, for example).

In accordance with various embodiments, the processor may comprise one or more processors, controllers, microprocessors, microcontrollers, application specific integrated circuits (ASICs), digital signal processors, programmable logic devices, field programmable gate arrays, or any combination of these devices or structures, or other known devices and structures, to perform the functions described below.

In the present example, the controller 100 comprises a central processing unit (CPU) 101, a digital signal processor (DSP) 102, and a storage 103. The storage 103 includes a non-transitory recording medium readable by the CPU 101 and the DSP 102 such as a read only memory (ROM) and a random access memory (RAM). The ROM of the storage 103 is, for example, a flash ROM (flash memory) that is a non-volatile memory. The storage 103 stores a plurality of control programs 103a to control the electronic apparatus 10. The CPU 101 and the DSP 102 execute the various control programs 103a in the storage 103 to achieve various functions of the controller 100.

A configuration of the controller 100 is not limited to the example in FIG. 4. For example, the controller 100 may comprise a plurality of CPUs 101. In this case, the controller 100 may comprise a main CPU performing comparative complex processing and a sub CPU performing comparative simple processing. It is also applicable that the controller 100 does not comprise the DSP 102 or comprises a plurality of DSPs 102. All or some of the functions of the controller 100 may be achieved by a hardware circuit that needs no software to achieve the functions above.

The storage 103 may comprise a non-transitory computer readable recording medium other than the ROM and the RAM. The storage 103 may comprise, for example, a compact hard disk drive and a solid state drive (SSD).

The plurality of control programs 103a in the storage 103 include various applications (application programs). The storage 103 stores, for example, a call application to perform a voice call and a video call, a browser to display a website, and a mail application to create, browse, send, and receive an e-mail. The storage 103 also stores a camera application to take a picture of an object using the first camera 180 and the second camera 190, a recorded image display application to display a still image and a video recorded in the storage 103, and a music reproduction control application to control a reproduction of music data stored in the storage 103. The storage 103 may store at least one application in the storage 103 in advance. The electronic apparatus 10 may download the at least one application in the storage 103 from the other device and store it in the storage 103.

The wireless communication unit 110 comprises an antenna 111. The wireless communication unit 110 can perform a wireless communication in several types of communication systems, for example, using the antenna 111. The controller 100 controls the wireless communication of the wireless communication unit 110.

The wireless communication unit 110 can perform a wireless communication with a base station of a mobile phone system. The wireless communication unit 110 can communicate with a mobile phone different from the electronic apparatus 10 or a web server via a network such as the base station or Internet. The electronic apparatus 10 can perform a data communication, a voice call, and a video call with the other mobile phone, for example.

The wireless communication unit 110 can perform a wireless communication with the roadside unit 5 and the vehicle 6. The wireless communication unit 110 can perform a wireless communication using the wireless local area network (LAN) such as Wifi. The wireless communication unit 110 can perform a near field wireless communication. For example, the wireless communication unit 110 can perform the wireless communication in conformity to Bluetooth (registered trademark). The wireless communication unit 110 may perform the wireless communication in conformity to at least one of ZigBee (registered trademark) and near field communication (NFC).

The wireless communication unit 110 can perform various types of processing such as amplification processing on a signal received by the antenna 111 and then outputs a resultant signal to the controller 100. The controller 100 can perform the various types of processing on the received signal which has been input, to obtain information contained in the received signal. The controller 100 outputs a transmission signal containing the information to the wireless communication unit 110. The wireless communication unit 110 can perform the various types of processing such as amplification processing on the transmission signal being has been input, and then wirelessly transmits a resultant signal from the antenna 111.

The display 120 comprises the display region 12 located in the front surface of the electronic apparatus 10 and a display panel 121. The display 120 can display various types of information in the display region 12. The display panel 121 is a liquid crystal display panel or an organic EL panel, for example. The display panel 121 can display various types of information such as characters, symbols, and graphics under control of the controller 100. The display panel 121 faces the display region 12 in the apparatus case 11. The information displayed on the display panel 121 is displayed in the display region 12.

The operation unit 210 can receive various operations performed by the user 9 on the electronic apparatus 10. The operation unit 210 comprises the touch panel 130 and the operation button group 220.

The touch panel 130 can detect an operation performed on the display region 12 with the operator such as the finger. The touch panel 130 is, for example, a projected capacitive touch panel. The touch panel 130 is located on a back side of the display region 12, for example. When the user 9 performs the operation on the display surface 12 with the operator such as his/her finger, the touch panel 130 can input, to the controller 100, an electrical signal corresponding to the operation. The controller 100 can specify contents of the operation performed on the display region 12 based on an electrical signal being output from the touch panel 130. The controller 100 can perform the processing corresponding to the specified operation contents.

When the user 9 operates each operation button 22 of the operation button group 220, the operation button 22 can output to the controller 100 an operation signal indicating that the operation button 22 has been operated. The controller 100 can accordingly determine whether or not each operation button 22 has been operated for each operation button 22. The controller 100 to which the operation signal is input controls the other component, thereby causing the electronic apparatus 10 to execute the function allocated to the operated operation button 22.

The satellite signal receiver 140 can receive a satellite signal transmitted by a positioning satellite. Then, the satellite signal receiver 140 can obtain positional information indicating a position of the electronic apparatus 10 based on the received satellite signal. The positional information obtained by the satellite signal receiver 140 includes a latitude and a longitude indicating a position of the electronic apparatus 10, for example. The controller 100 can operate the satellite signal receiver 140 and stop the operation thereof. The satellite signal receiver 140 may be simply referred to as "the receiver 140" in some cases hereinafter.

The receiver 140 is a GPS (global positioning system) receiver, for example, and can receive a wireless signal from the positioning satellite of a GPS. The receiver 140 calculates a current position of the electronic apparatus 10 with a latitude and a longitude, for example, based on the received wireless signal, and outputs the positional information including the calculated latitude and longitude to the controller 100. The positional information of the electronic apparatus 10 is also considered as positional information indicating the position of the user 9 holding the electronic apparatus 10.

The receiver 140 may obtain the positional information of the electronic apparatus 10 based on the signal transmitted by the positioning satellite of global navigation satellite system (GNSS) other than GPS. For example, the receiver 140 may obtain the positional information of the electronic apparatus 10 based on a signal transmitted by a positioning satellite of global navigation satellite system (GLONASS), Indian regional navigational satellite system (IRNSS), COMPASS, Galileo, or quasi-zenith satellites system (QZSS).

The microphone 170 can convert a sound being input from the outside of the electronic apparatus 10 into an electrical sound signal and then output the electrical sound signal to the controller 100. The sound from the outside of the electronic apparatus 10 is taken inside the electronic apparatus 10 through the microphone hole 15 and input to the microphone 170.

The speaker 160 is, for example, a dynamic speaker. The speaker 160 can convert an electrical sound signal from the controller 100 into a sound and then output the sound. The sound being output from the speaker 160 is output outside through the speaker hole 14. The user 9 can hear the sound being output from the speaker hole 14 in a place apart from the electronic apparatus 10.

The receiver 150 can output a received sound. The receiver 150 is, for example, a dynamic speaker. The receiver 150 can convert an electrical sound signal from the controller 100 into a sound and then output the sound. The sound being output from the receiver 150 is output outside through the receiver hole 13. A volume of the sound being output through the receiver hole 13 is set to be smaller than a volume of the sound being output through the speaker hole 14. The user 9 brings the receiver hole 13 close to his/her ear, thereby being able to hear the sound being output through the receiver hole 13. A vibration element such as a piezoelectric vibration element for causing a portion of the front surface of the apparatus case 11 to vibrate may be provided instead of the receiver 150. In this case, the sound is transmitted to the user in a form of the vibration of the portion of the front surface.

The first camera 180 comprises the lens 181, an image sensor, and so on. The second camera 290 comprises the lens 191, an image sensor, and so on. Each of the first camera 180 and the second camera 190 can take an image of an object under control of the controller 100, generate a still image or a video of the object, and then output the still image or the video to the controller 100.

The lens 181 of the first camera 180 can be visually recognized from the front surface 11a of the apparatus case 11. Accordingly, the first camera 180 can take an image of an object located on a front surface side (in other words, a display region 12 side) of the electronic apparatus 10. The first camera 180 is referred to as an in-camera. In the meanwhile, the lens 191 of the second camera 190 can be visually recognized from the rear surface 11b of the apparatus case 11. Accordingly, the second camera 190 can take an image of an object located on a rear surface side of the electronic apparatus 10. The second camera 190 is referred to as an out-camera.

The accelerometer 200 can detect an acceleration of the electronic apparatus 10. The accelerometer 200 is a three-axis accelerometer, for example. The accelerometer 200 can detect an acceleration of the electronic apparatus 10 in an x axis direction, a y axis direction and a z axis direction. The x axis direction, the y axis direction, and the z axis direction are set to a longitudinal direction, a short-side direction, and a thickness direction of the electronic apparatus 10, respectively, for example.

The battery 230 can output a power source for the electronic apparatus 10. The battery 230 is, for example, a rechargeable battery. The battery 230 can supply the power source to various components such as the controller 100 and the wireless communication unit 110 included in the electronic apparatus 10.

It is also applicable that the electronic apparatus 10 does not comprise the accelerometer 200. In this case, the electronic apparatus 10 may have a wireless or wired connection with the accelerometer separated from the electronic apparatus 10.

The electronic apparatus 10 may comprise a sensor other than the accelerometer 200. For example, the electronic apparatus 10 may comprise at least one of an atmospheric pressure sensor, a geomagnetic sensor, a temperature sensor, a proximity sensor, an illuminance sensor, and a gyro sensor. The electronic apparatus 10 may have a wireless or wired connection with a sensor other the accelerometer 200 separated from the electronic apparatus 10.

It is also applicable that the electronic apparatus 10 does not comprise the receiver 140. In this case, the electronic apparatus 10 may have a wireless or wired connection with the receiver 140 separated from the electronic apparatus 10.

<One Example of Function Block in Controller>

Figure 5:
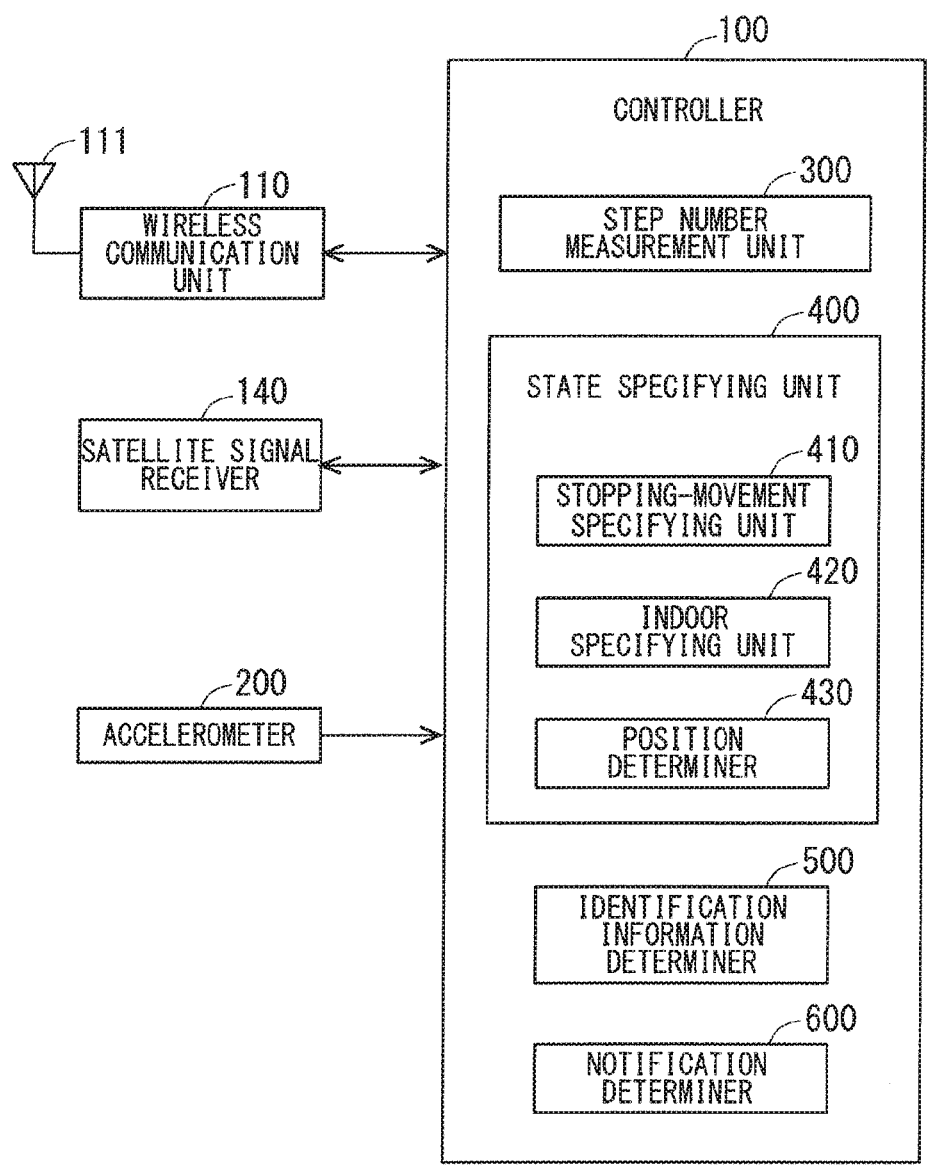
FIG. 5 is a block diagram illustrating one example of a configuration of a controller.

FIG. 5 is a drawing showing one example of some of function blocks formed when the CPU 101 and the DSP 102 execute a control program 103a in the storage 103.

As illustrated in FIG. 5, the controller 100 comprises a step number measurement unit 300, a state specifying unit 400, an identification information determiner 500, and a notification determiner 600 as the function blocks. At least one of the step number measurement unit 300, the state specifying unit 400, the identification information determiner 500 and the notification determiner 600 may be achieved by a hardware circuit that needs no software to achieve the functions above.

The state specifying unit 400 can specify various states of the user 9. The state specifying unit 400 comprises, for example, a stopping-movement specifying unit 410, an indoor specifying unit 420, and a position determiner 430. At least one of the stopping-movement specifying unit 410, the indoor specifying unit 420, and the position determiner 430 may be achieved by a hardware circuit that needs no software to achieve the functions above.

When the controller 100 comprises a main CPU and a sub CPU, the sub CPU may achieve some function blocks and the main CPU may achieve the remaining function blocks in the plurality of the function blocks illustrated in FIG. 5. For example, the sub CPU may achieve the stopping-movement specifying unit 410 and the main CPU may achieve the remaining function blocks.

The stopping-movement specifying unit 410 can perform a stopping-movement specification for specifying the state of the user 9 regarding the stopping and the movement of the user 9. The stopping-movement specifying unit 410 can specify the user 9 stopping and the user 9 traveling in the stopping-movement specification. In other words, the stopping-movement specifying unit 410 can determine whether the user 9 is in a stopping state or a traveling state. Still in other words, the stopping-movement specifying unit 410 can determine whether or not the user 9 travels. Since the stopping of the user 9 is considered as the stopping of the electronic apparatus 10, the stopping-movement specifying unit 410 is deemed to function as a determiner determining whether or not the electronic apparatus 10 is stopping. The stopping-movement specifying unit 410 can specify the user 9 stopping and the user 9 traveling based on at least one of the positional information obtained by the receiver 140 and the acceleration detected by the accelerometer 200, for example.

The stopping-movement specifying unit 410 can specify the user 9 stopping and the user 9 starting traveling in the stopping-movement specification. The stopping-movement specifying unit 410 determines that the user 9 stops when the state of the user 9 changes from the traveling state to the stopping state. The stopping-movement specifying unit 410 determines that the user 9 starts traveling when the state of the user 9 changes from the stopping state to the traveling state.

The stopping of the user 9 is considered as the stopping of the movement of the electronic apparatus 10, thus the stopping-movement specifying unit 410 is deemed to be able to specify the stopping of the movement of the electronic apparatus 10. The start of the movement of the user 9 is considered as the start of the movement of the electronic apparatus 10, thus the stopping-movement specifying unit 410 is deemed to be able to specify the start of the movement of the electronic apparatus 10.

The stopping-movement specifying unit 410 can specify, in the stopping-movement specification, a travel means of the user 9 when the stopping-movement specifying unit 410 determines that the user 9 is traveling. For example, the stopping-movement specifying unit 410 can specify whether the user 9 is traveling by himself/herself without riding a conveying device or traveling in the conveying device, based on the acceleration detected by the accelerometer 200. Herein, the term "the user 9 travels by himself/herself" means that the user 9 travels on foot without riding the conveying device. When the action of the user 9 traveling by himself/herself is referred to as "self traveling", the stopping-movement specifying unit 410 is deemed to be able to specify the self traveling of the user 9. When the action of the user 9 traveling in the conveying device is referred to as "conveying-device traveling", the stopping-movement specifying unit 410 can specify the conveying-device traveling of the user 9.

The self traveling which the stopping-movement specifying unit 410 can specify includes the movement of the user 9 by walking and the movement of the user 9 by running. When the action of the user 9 traveling by running is referred to as "running", the self traveling includes the walking and the running. The conveying-device traveling which the stopping-movement specifying unit 410 can specify includes the movement of the user 9 by bicycle and the movement of the user 9 by a conveying device, such as an automobile, a train, and a bus, which enables a traveling faster than the bicycle.

Hereinafter, the simple term "the conveying device" means a conveying device which enables the traveling faster than the bicycle, in order to distinguish the bicycle from a conveying device which enables the traveling faster than the bicycle. The term "self" is used as a name of a travel means in the case where the user 9 performs the self traveling, the term "walking" is used as a name of a travel means in the case where the user 9 travels by walking, and the term "running" is used as a name of a travel means in the case where the user 9 travels by running.

Known is that the acceleration of the electronic apparatus 10 shows a specific pattern of time change corresponding to the travel means of the user 9 having the electronic apparatus 10. The stopping-movement specifying unit 410 specifies that the travel means of the user 9 is "walking" when the pattern of the time change of the acceleration detected by the accelerometer 200 shows the pattern corresponding to "walking". The stopping-movement specifying unit 410 specifies that the travel means of the user 9 is "running" when the pattern of the time change of the acceleration detected by the accelerometer 200 shows the pattern corresponding to "running". The stopping-movement specifying unit 410 specifies that the travel means of the user 9 is "bicycle" when the pattern of the time change of the acceleration detected by the accelerometer 200 shows the pattern corresponding to "bicycle". The stopping-movement specifying unit 410 specifies that the travel means of the user 9 is "conveying device" when the pattern of the time change of the acceleration detected by the accelerometer 200 shows the pattern corresponding to "conveying device".

In the manner described above, the stopping-movement specifying unit 410 can specify which is the travel means of the user 9, the walking, the running, the bicycle, or the conveying device. The controller 100 can display the travel means specified by the stopping-movement specifying unit 410 and a moving distance of the user 9 (in other words, a moving distance of the electronic apparatus 10), for example, on the display 120. Accordingly, the user 9 can confirm a walking distance, a running distance, a moving distance by bicycle, and a moving distance by the conveying device distinctively from each other. The controller 100 can obtain the moving distance of the user 9 based on the positional information obtained by the receiver 140, for example.

The indoor specifying unit 420 can specify that the user 9 is in a facility such as a house, a building, and a shop. That is to say, the indoor specifying unit 420 can perform an indoor specification for specifying that the user 9 is located indoors. A state where the user 9 is located indoors is simply referred to as "indoor" and a state where the user 9 is not located indoors is simply referred to as "outdoor" in some cases. Details of the indoor specification are described hereinafter.

The position determiner 430 can determine whether or not the user 9 is located in a predetermined region (in other words, a predetermined position). In other words, the position determiner 430 can determine whether or not the electronic apparatus 10 is located in a predetermined region (in other words, a predetermined position). Adopted as the predetermined region are, for example, an area where an accident is likely to occur between the pedestrian and the vehicle 6 and a region including a neighborhood of the area. The predetermined region includes, for example, an intersection region including the intersection 2 and a neighborhood thereof, a T-shaped intersection region including a T-shaped intersection and a neighborhood thereof, and a school route region including a school route of children and a neighborhood thereof. The position determiner 430 can separately determine whether or not the user 9 is located in the intersection region, whether or not the user 9 is located in the T-shaped intersection region, and whether or not the user 9 is located in the school route region.

The position determiner 430 can determine whether or not the user 9 is located in the predetermined region based on the positional information obtained by the receiver 140 and map information stored in the storage 103, for example. The position determiner 430 may determine whether or not the user 9 is located in the predetermined region based on whether or not the wireless communication unit 110 can receive the signal from the roadside unit 5 disposed in the intersection 2, for example.

As described above, the state specifying unit 400 can specify various states of the user 9. The types of the states of the user 9 specified by the state specifying unit 400 are not limited to those described above.

The step number measurement unit 300 can measure a total number of steps of the user 9 who performs the self traveling. The step number measurement unit 300 measures the number of steps of the user 9 who performs the self traveling based on the acceleration detected by the accelerometer 200, for example. The step number measurement unit 300 measures the number of steps of the user 9 when the stopping-movement specifying unit 410 specifies that the user 9 is walking or running. The controller 100 can display the number of steps measured by the step number measurement unit 300 on the display 120.

The identification information determiner 500 determines whether registered identification information stored in the storage 103 coincides with identification information received by the wireless communication unit 110 from a communication device and allocated to the communication device. A result of determination by the identification information determiner 500 is used for the indoor specification. Details of the operation of the identification information determiner 500 are described hereinafter.

The notification determiner 600 can perform determination processing for determining whether or not the electronic apparatus 10 transmits a notification outside the electronic apparatus 10 based on the state of the user 9 specified by the state specifying unit 400, for example.

For example, when the position determiner 430 determines that the user 9 is located in the intersection region and also when the stopping-movement specifying unit 410 specifies that the travel means of the user 9 is "running", the notification determiner 600 determines that the electronic apparatus 10 transmits the notification outside the electronic apparatus 10. When the position determiner 430 determines that the user 9 is located in the intersection region and also when the stopping-movement specifying unit 410 specifies that the travel means of the user 9 is "bicycle", the notification determiner 600 determines that the electronic apparatus 10 transmits the notification outside the electronic apparatus 10. When the notification determiner 600 determines that the electronic apparatus 10 transmits the notification outside the electronic apparatus 10, the wireless communication unit 110 transmits presence notification information for notifying the vehicle 6 located in the intersection region of the presence of the user 9 (the pedestrian) near the vehicle 6 to the roadside unit 5. The presence notification information may include information indicating the travel means of the user 9 specified by the stopping-movement specifying unit 410. The roadside unit 5 transmits the received presence notification information to the vehicle 6 located in the intersection region. At this time, the roadside unit 5 transmits the presence notification information in a broadcast form, for example. The vehicle 6 notifies a driver, for example, of a caution based on the received presence notification information. The vehicle 6 notifies the driver that the pedestrian is located near the vehicle 6 using a car navigation device, for example. Accordingly, the driver of the vehicle 6 located in the intersection region can drive the vehicle 6 while recognizing a person in the intersection region. As a result, safety in driving the vehicle 6 is increased. The state where the electronic apparatus 10 transmits the notification outside the electronic apparatus 10 is referred to as "notification execution" in some cases hereinafter. The state where the electronic apparatus 10 does not transmit the notification outside the electronic apparatus 10 is referred to as "notification non-execution" in some cases.

Contents of the information which the electronic apparatus 10 transmits outside the electronic apparatus 10 are not limited to the examples described above. The electronic apparatus 10 can also directly transmit the notification to the vehicle 6.

<One Example of Indoor Specification>

Details of the indoor specification in the present example are described hereinafter. Identification information called basic service set identifier (BSSID) is allocated to an access point which is a type of a communication device performing a wireless communication using a wireless LAN. The BSSID is information specific to each access point. A user of the access point cannot change contents of the BSSID allocated to the access point. For example, a MAC address is adopted to the BSSID. Information other than the MAC address may be adopted to the BSSID.

Identification information called an extended service set identifier (ESSID) is also allocated to an access point in addition to a BSSID. An ESSID is sometimes called a network name. A user of an access point is able to change the contents of a network name allocated to the access point. The user operates, for example, an access point, thereby changing the contents of a network name allocated to the access point. An access point is capable of periodically broadcasting a BSSID and a network name allocated thereto, in a wireless manner, for example. The electronic apparatus 10 is capable of receiving both the BSSID and the network name from the access point.

Since a network name allocated to an access point is changeable, network names of a plurality of access points provided in one building are sometimes set to be the same as one another. In other words, a common network name is sometimes allocated to a plurality of access points provided in one building. For example, in a case where a plurality of access points are provided in a building of a business office of a certain company, a designation of the business office is sometimes adopted as a network name of the plurality of access points. It can be said that a common network name allocated to a plurality of access points is a group name of a group constituted of the plurality of access points.

In this example, a certain network name is registered as a registered network name in the storage 103. It can be said that the registered network name is registered identification information. A method of registering the registered network name will be described later. The controller 100 determines whether a network name (identification information) received by the wireless communication unit 110 from an access point agrees with a registered network name (registered identification information) in the storage 103, and performs indoor specification, based on the result of determination.

Figure 6:
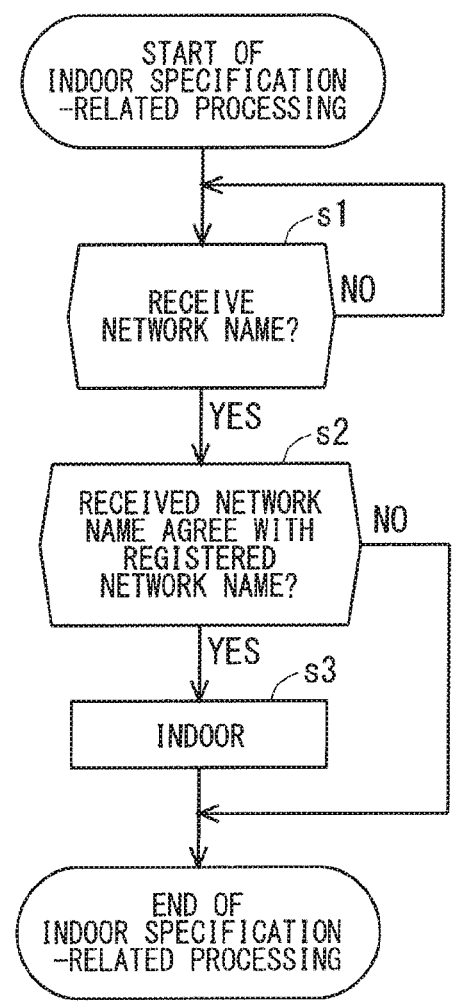
FIG. 6 is a flowchart illustrating one example of operation of the electronic apparatus.

FIG. 6 is a flowchart illustrating one example of operation of the electronic apparatus 10 executing processing concerning the indoor specification (hereinafter, referred to as "indoor specification-related processing"). The electronic apparatus 10 repeatedly executes the indoor specification-related processing illustrated in FIG. 6 at regular or irregular intervals.

As illustrated in FIG. 6, in Step s1, the controller 100 determines whether the wireless communication unit 110 receives a network name. In other words, the controller 100 determines whether a network name can be acquired from a reception signal at the wireless communication unit 110. Step s1 is executed until it is determined that the wireless communication unit 110 receives a network name.

When it is determined in Step s1 that the wireless communication unit 110 receives a network name, in Step s2, the identification information determiner 500 determines whether a network name received by the wireless communication unit 110 from an access point (hereinafter, referred to as a "received network name" as appropriate) agrees with a registered network name in the storage 103. When it is determined in Step s2 that the received network name disagrees with the registered network name, the indoor specification-related processing ends. On the other hand, when it is determined that the received network name agrees with the registered network name, in Step s3, the indoor specifying unit 420 determines that the user 9 is indoors. When Step s3 is executed, the indoor specification-related processing ends.

When it is determined in Step s1 that a plurality of network names are received, it is determined in Step s2 whether each of the plurality of network names agrees with the registered network name. In Step s3, when it is determined that at least one of the plurality of network names agrees with the registered network name, it is determined as "indoor". On the other hand, when all the plurality of network names disagree with the registered network name, the indoor specification-related processing ends.

A plurality of registered network names may be registered in the storage 103. In this case, when a received network name agrees with any of the plurality of registered network names, it is determined as "indoor". When it is determined in Step s1 that a plurality of network names are received, in a case where the plurality of network names include a network name that agrees with any of the plurality of registered network names, it is determined as "indoor".

As described above, since the contents of a network name are changeable, a common network name is sometimes allocated to a plurality of access points in the same building. In a case where a common network name allocated to the plurality of access points in the same building (hereinafter, referred to as a "common network name" as appropriate) is registered as a registered network name in the storage 103, when a received network name agrees with the registered network name, there is a high possibility that the wireless communication unit 110 performs communication with an access point in the building. Therefore, in a case where the received network name agrees with the registered network name, there is a high possibility that the user 9 is indoors.

In this example, hence, in consideration of a possibility that the common network name is registered as the registered network name, when it is determined in Step s2 that the received network name agrees with the registered network name, the indoor specifying unit 420 executes Step s3 to make the determination as "indoor". On the other hand, in a case where the received network name disagrees with the registered network name, it is unclear as to whether the user 9 is indoors. Accordingly, when it is determined that the received network name disagrees with the registered network name, the indoor specifying unit 420 does not make the determination as "indoor".

As described above, the indoor specifying unit 420 specifies that the user 9 is indoors, based on a result of determination as to whether a received network name agrees with a registered network name, and is therefore capable of more correctly determining that the user 9 is indoors.

FIG. 7 is a view illustrating one example of a state in which the user 9 carrying the electronic apparatus 10 is in a building 700 where a plurality of access points are provided. In the example illustrated in FIG. 7, there are a room 711 and a room 712 on a first floor 710 of the building 700, and there are a room 721 and a room 722 on a second floor 720 of the building 700. The room 711, the room 712, the room 721, and the room 722 are respectively provided with an access point 801, an access point 802, an access point 803, and an access point 804. A common network name is allocated to the plurality of access points 801 to 804. The common network name allocated to the access points 801 to 804 is registered as a registered network name in the storage 103 of the electronic apparatus 10.

As illustrated in FIG. 7, for example, when the user 9 is in the room 721 of the second floor 720, a received network name received by the wireless communication unit 110 agrees with the registered network name in the storage 103. The indoor specifying unit 420 accordingly determines that the user 9 is indoors. Even when the user 9 moves from the room 721 of the second floor 720 to the room 712 of the first floor 710, a received network name received by the wireless communication unit 110 agrees with the registered network name in the storage 103. The indoor specifying unit 420 accordingly determines that the user 9 is indoors. Even when the user 9 is in which one of the room 711, the room 712, the room 721, and the room 722, the indoor specifying unit 420 is capable of specifying that the user 9 is indoors.

Also in this example, once a common network name allocated to the plurality of indoor access points is registered as a registered network name in the electronic apparatus 10, thereafter, the network name is not necessarily registered in the electronic apparatus 10, and it is possible to specify that the user 9 is indoors, even when the electronic apparatus 10 performs communication with which one of the plurality of access points.

In contrast to this, in a case of performing the indoor specification, using BSSIDs indicating different contents for the respective access points in place of the network name, there is a possibility that the presence of the user 9 in the building cannot be appropriately specified unless all the BSSIDs of the plurality of access points provided in the building are registered in the electronic apparatus 10.

In the example illustrated in FIG. 7, considerations are given to, for example, a case where the BSSID of the access point 803 is registered as a registered BSSID in the storage 103. In this case, when the user 9 is in the room 721, the BSSID received by the wireless communication unit 110 agrees with the registered BSSID; therefore, it is determined as "indoor" by the indoor specification. On the other hand, when the user 9 is in the room 712, the BSSID received by the wireless communication unit 110 disagrees with the registered BSSID. Therefore, it is not determined as "indoor" by the indoor specification although the user 9 is in the room 712. Even when the user 9 is in which one of the room 711, the room 712, the room 721, and the room 722, it is necessary to register all the BSSIDs of the access points 801 to 804 as the registered BSSID in the storage 103 in order that the indoor specifying unit 420 makes the determination as "indoor". In other words, even when the electronic apparatus 10 performs communication with which one of the access points 801 to 804, it is necessary to register all the BSSIDs of the access points 801 to 804 as the registered BSSID in the storage 103 in order that the indoor specifying unit 420 makes the determination as "indoor".

In this example, it is possible to correctly specify that the user 9 is indoors even in a case where the electronic apparatus 10 performs communication with which one of the plurality of access points only in such a manner that the common network name to the plurality of access points in the building is registered as the registered network name in the electronic apparatus 10. Therefore, the performance of the electronic apparatus 10 is further improved.

<One Example of Method of Registering Network Name>

Next, an example of a method of registering a network name will be described. The electronic apparatus 10 has operation modes including a registration mode for registering a network name. When the user 9 performs a predetermined operation on the display region 12, for example, the operation mode of the electronic apparatus 10 is changed to the registration mode.

Figure 8:
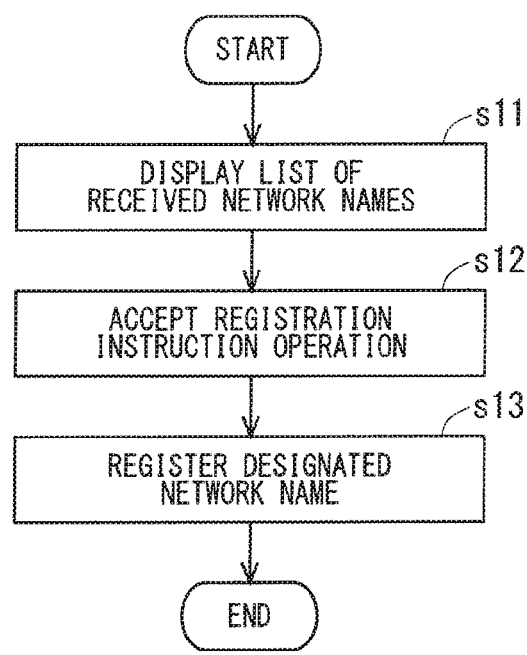
FIG. 8 is a flowchart illustrating one example of operation of the electronic apparatus.

FIG. 8 is a flowchart illustrating one example of operation of the electronic apparatus 10 in the registration mode. When the operation mode of the electronic apparatus 10 is changed to the registration mode, as illustrated in FIG. 8, in Step s11, the controller 100 causes the display 120 to display a list of network names received by the wireless communication unit 110. In Step s12, next, the operation unit 210 accepts a registration instruction operation by the user 9 for providing an instruction to register the network names displayed on the display 120 as a registered network name in the electronic apparatus 10. In Step s13, next, the controller 100 registers, in the storage 103, the network names designated by the registration instruction operation accepted in Step s12. The registered network names are thus stored in the storage 103. Thereafter, when a predetermined operation is performed on the display region 12, for example, the registration mode is canceled.

The registration instruction operation may be a tapping operation for the network names displayed on the display region 12. The user 9 taps his/her finger on a common network name among the network names displayed on the display region 12, thereby designating the common network name as a registration target. In Step s13, the designated common network name is registered in the storage 103.

For example, in a case where the user 9 is in the room 721 illustrated in FIG. 7 described above, when the operation mode of the electronic apparatus 10 is changed to the registration mode, the common network name to the access points 801 to 804 is displayed on the display 120. When the user 9 taps his/her finger on the common network name displayed on the display region 12, the common network name is registered as a registered network name in the storage 103. The electronic apparatus 10 is thus capable of correctly specifying that the user 9 is indoors even when the user 9 is in which one of the room 711, the room 712, the room 721, and the room 722.

Figure 9:
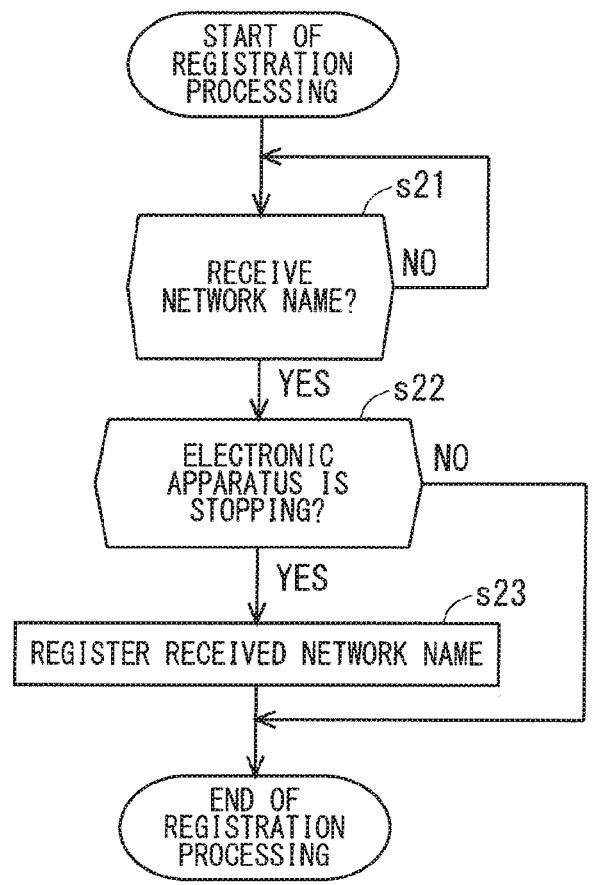
FIG. 9 is a flowchart illustrating one example of operation of the electronic apparatus.

In the example described above, a network name is registered in the electronic apparatus 10 by the operation performed on the electronic apparatus 10 by the user. Alternatively, a network name may be automatically registered in the electronic apparatus 10. FIG. 9 is a flowchart illustrating one example of operation of the electronic apparatus 10 in this case. The electronic apparatus 10 repeatedly executes registration processing illustrated in FIG. 9 at regular or irregular intervals.

As illustrated in FIG. 9, in Step s21, the controller 100 determines whether the wireless communication unit 110 receives a network name. Step s21 is executed until it is determined that the wireless communication unit 110 receives a network name.

When it is determined in Step s21 that the wireless communication unit 110 receives a network name, in Step s22, the stopping-movement specifying unit 410 of the controller 100 determines whether the electronic apparatus 10 is stopping. When it is determined in Step s22 that the electronic apparatus 10 is not is stopping, the registration processing ends. On the other hand, when it is determined in Step s22 that the electronic apparatus 10 is stopping, in Step s23, the controller 100 registers the network name received in Step s21 as a registered network name in the storage 103. However, if the network name received in Step s21 has been already registered, the network name is not registered. In a case where the electronic apparatus 10 is stopping, there is a high possibility that the user 9 is indoors. Therefore, in a case where the wireless communication unit 110 receives a network name from an access point on condition that the electronic apparatus 10 is stopping, there is a high possibility that the access point is indoors. Hence, in a case where the network name received by the wireless communication unit 110 on condition that the electronic apparatus 10 is stopping is registered as the registered network name, there is a high possibility that a common network name allocated to a plurality of access points located indoors is regarded as the registered network name. For example, in a case where the electronic apparatus 10 is put on a desk or the like in the room 712 illustrated in FIG. 7, the common network name to the access points 801 to 804 is registered as a registered network name in the storage 103.

Figure 10:
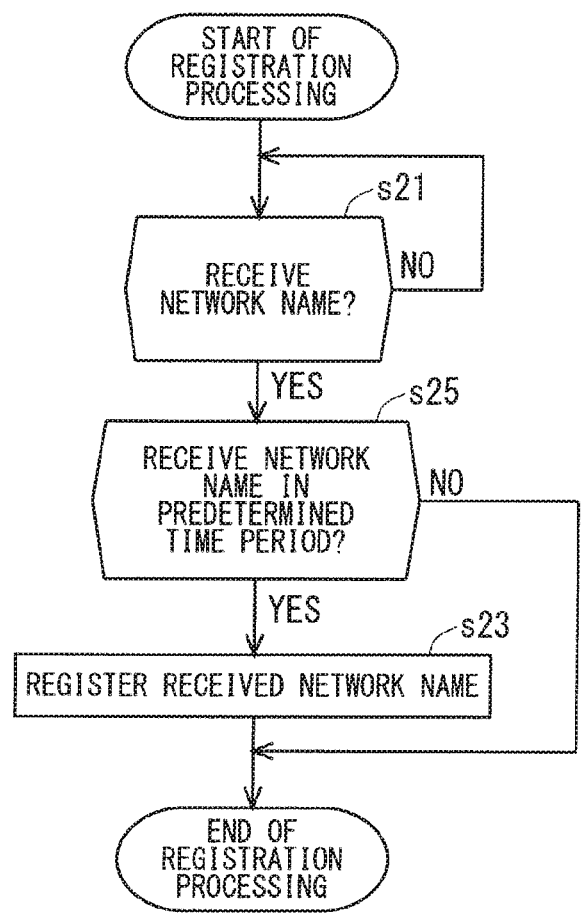
FIG. 10 is a flowchart illustrating one example of operation of the electronic apparatus.

It should be noted that in the registration processing, Step s25 may be executed in place of Step s22 as illustrated in FIG. 10. In Step s25, the controller 100 determines whether the wireless communication unit 110 receives the network name in a predetermined time period. In other words, the controller 100 determines whether a time at which a network name is received in Step s21 falls within the predetermined time period. The predetermined time period may be a time period during which the user 9 is located indoors very probably, for example, a time period in the nighttime. The time period in the nighttime may be a time period from 11 p.m. to 2 a.m., for example. In addition, in a case where the controller 100 estimates a time period during which the user 9 is indoors very probably, based on positional information by the receiver 140, for example, the controller 100 may determine whether a network name is received in the estimated time period. When the controller 100 determines in Step s25 that the wireless communication unit 110 receives a network name in the predetermined time period, then the controller 100 executes Step s23 to register the network name as a registered network name in the storage 103.

Figure 11:
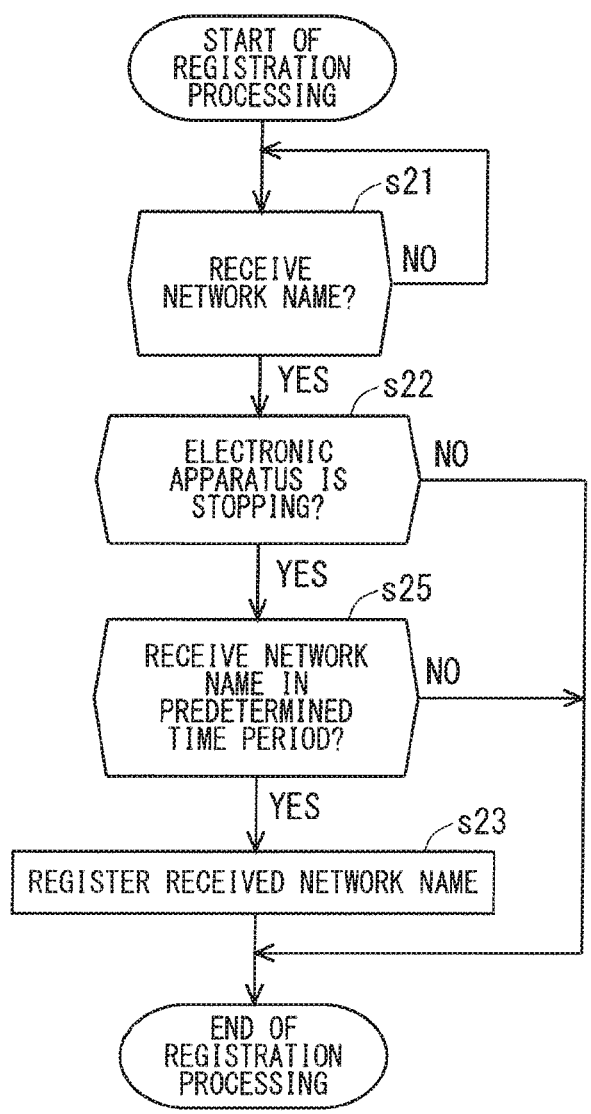
FIG. 11 is a flowchart illustrating one example of operation of the electronic apparatus.

Alternatively, as illustrated in FIG. 11, in the registration processing, Step s25 may be executed subsequently to Step s22. In the example illustrated in FIG. 11, when it is determined in Step s22 that the electronic apparatus 10 is stopping, Step s25 is executed. When it is determined in Step s25 that the wireless communication unit 110 receives a network name in a predetermined time period, the network name is registered in Step s23. It should be noted that Step s22 may be executed subsequently to Step s25.

As illustrated in FIGS. 9 to 11, the convenience of the electronic apparatus 10 is improved in such a manner that a network name is automatically registered in the electronic apparatus 10.

<One Example of Series of Operations of Electronic Apparatus for Providing Notification Externally>

FIG. 12 is a flowchart illustrating one example of operation of the electronic apparatus 10 for providing a notification to the outside of the electronic apparatus 10. The electronic apparatus 10 repeatedly executes a series of processes illustrated in FIG. 12 at regular or irregular intervals.

As illustrated in FIG. 12, in Step s31, the position determiner 430 determines whether or not the electronic apparatus 10 is located in the predetermined region. When it is determined in Step s31 that the electronic apparatus 10 is located in the predetermined region, the stopping-movement specifying unit 410 performs the stopping-movement specification in Step s32. When it is not determined in Step s31 that the electronic apparatus 10 is located in the predetermined region, Step s31 is executed again.

When it is specified that the user 9 is traveling and the travel means of the user 9 is "conveying device" in the stopping-movement specification in Step s32, the notification determiner 500 determines the notification non-execution in Step s35. When the travel means of the user 9 is the conveying device such as the automobile, the train, and the bus, the user 9 has a high possibility of being safe from the vehicle 6, thus it is deemed that there is a less need for providing a driver of the vehicle 6 with the caution. Thus, when it is specified that the travel means of the user 9 is "conveying device", the notification determiner 600 determines that the electronic apparatus 10 does not transmit the notification outside. Accordingly, when the user 9 is safe from the vehicle 6, a possibility that the driver of the vehicle 6 receives information which is not so much necessary can be reduced. Thus, a possibility that the driver of the vehicle 6 feels bothersome due to the receipt of the information which is not so much necessary can be reduced. When Step s35 is executed, the electronic apparatus 10 executes Step s31 again, and subsequently operates in the similar manner.

When it is specified that the user 9 is traveling and the travel means of the user 9 is "running" in the stopping-movement specification in Step s32, Step s34 is executed. When it is specified that the user 9 is traveling and the travel means of the user 9 is "bicycle" in the stopping-movement specification, Step 34 is executed. In Step s34, the notification determiner 600 determines the notification execution. When the travel means of the user 9 is "running" and "bicycle", the user 9 is far from being safe from the vehicle 6. Thus, when it is specified that the travel means of the user 9 is "running" or "bicycle", the notification determiner 600 determines that the electronic apparatus 10 transmits the notification outside. When Step s34 is executed, the electronic apparatus 10 executes Step s31 again, and subsequently operates in the similar manner.

When the notification determiner 600 determines the notification execution, the wireless communication unit 110 notifies the roadside unit 5 of presence notification information described above, for example. The roadside unit 5 notifies the vehicle 6 located in the predetermined region of the received presence notification information. When it is determined that the electronic apparatus 10 is located in the T-shaped intersection region, for example, in Step s31, the roadside unit 5 provided in the T-shaped intersection region notifies the vehicle 6 located in the T-shaped intersection region of the presence notification information received from the electronic apparatus 10. The vehicle 6 notifies a driver of a caution based on the received presence notification information. The electronic apparatus 10 may directly notify the vehicle 6 located in the T-shaped intersection region of the presence notification information.

When it is specified that the user 9 is stopping in the stopping-movement specification in Step s32, the controller 100 determines in Step s33 whether or not the location of the user 9 is determined to be "indoor" in the immediately previous indoor specification in the indoor specifying unit 420. When it is specified that the user 9 is traveling and the travel means of the user 9 is "walking" in the stopping-movement specification, the controller 100 determines in Step s33 whether or not the location of the user 9 is determined to be "indoor" in the immediately previous indoor specification in the indoor specifying unit 420.

When the location of the user 9 is determined to be "indoor" in the immediately previous indoor specification in Step s33, Step s35 is executed and the notification non-execution is determined. When the user 9 is located in the facility such as the building, the user 9 has a high possibility of being safe from the vehicle 6. Accordingly, when the location of the user 9 is determined to be "indoor" in the immediately previous indoor specification, it is determined that the electronic apparatus 10 does not transmit the notification outside.

In the meanwhile, when it is confirmed that the location of the user 9 is not determined to be "indoor" in the immediately previous indoor specification in Step s33, Step s34 is executed and the notification execution is determined. When it is unknown whether or not the user 9 is located indoors, the user 9 is far from being safe from the vehicle 6. Accordingly, when the location of the user 9 is not determined to be "indoor" in the immediately previous indoor specification, it is determined that the electronic apparatus 10 transmits the notification outside.

The notification determiner 600 may determine the notification execution instead of Step s35. In this case, for example, the electronic apparatus 10 may transmit, via the roadside unit 5 or directly to the vehicle 6, notification information for notifying that the user 9 located near the vehicle 6 has a small risk of running out into a roadway.

Figure 13:
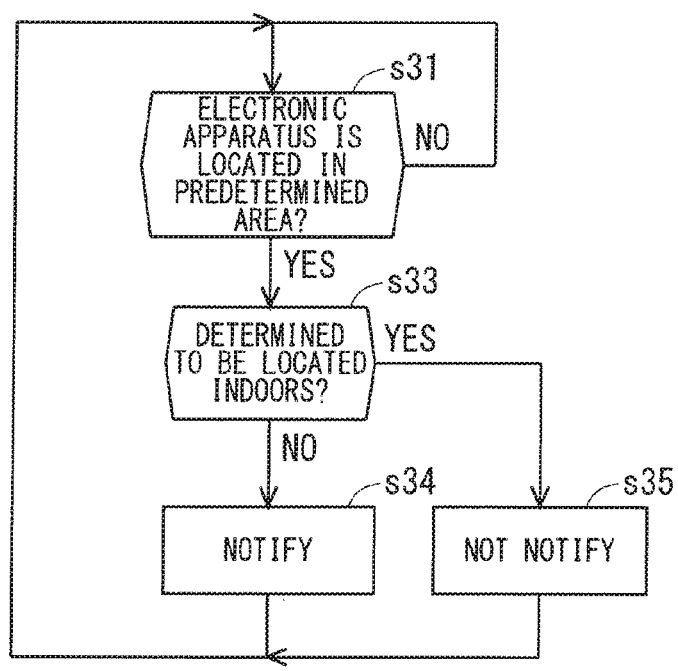
FIG. 13 is a flowchart illustrating one example of operation of the electronic apparatus.

As illustrated in FIG. 13, the stopping-movement specification of Step s32 may not be executed. In this case, when it is determined that the electronic apparatus 10 is located in the predetermined region in Step s31, Step s33 is executed.

As illustrated in FIG. 14, Step s31 may not be executed. In the example in FIG. 14, Step s31 is not executed in the flow in FIG. 13, however, Step s31 may not be executed in the flow in FIG. 12. In this case, when Step s34 is executed, Step s32 is executed again, and when Step s35 is executed, Step s32 is executed again.

Figure 15:
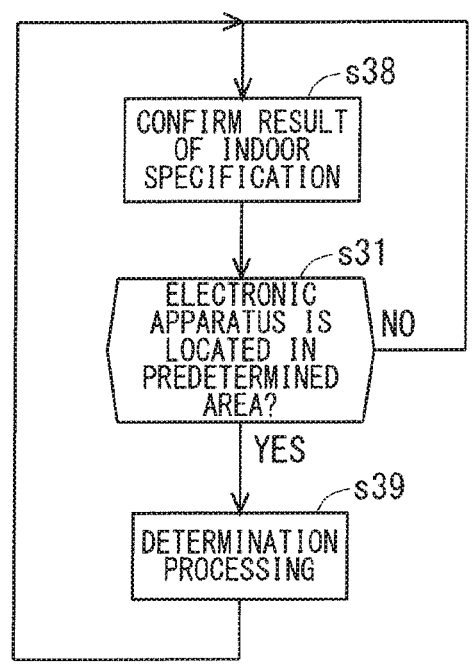
FIG. 15 is a flowchart illustrating one example of operation of the electronic apparatus.

As illustrated in FIG. 15, Step s31 may be executed after Step s38. In Step s38, the controller 100 confirms the result of the immediately previous indoor specification. When it is determined in Step s31 that the electronic apparatus 10 is located in the predetermined region, the notification determiner 600 performs, in Step s39, the determination processing for determining whether or not the electronic apparatus 10 transmits the notification outside based on the result confirmed in Step s38. When the location of the user 9 is determined to be "indoor" in the immediately previous indoor specification, the notification determiner 600 determines the notification non-execution in Step s39. When the location of the user 9 is not determined to be "indoor" in the immediately previous indoor specification, the notification determiner 600 determines the notification execution.

Although the stopping-movement specification is not performed in the example in FIG. 15, the stopping-movement specification may be performed before Step s31. In this case, in Step s39, the notification determiner 600 determines whether or not the electronic apparatus 10 transmits the notification outside based on the result of the stopping-movement specification and the result of the confirmation in Step s38. For example, when it is specified that the travel means is "conveying device" in the stopping-movement specification, the notification determiner 600 determines the notification no execution. When the location of the user 9 is determined to be "indoor" in the immediately previous indoor specification, the notification determiner 600 determines the notification non-execution. When it is specified that the travel means is "running" in the stopping-movement specification, the notification determiner 600 determines the notification execution. When it is specified that the travel means is "bicycle" in the stopping-movement specification, the notification determiner 600 determines the notification execution. When it is specified that the travel means is "walking" in the stopping-movement specification and the location of the user 9 is not determined to be "indoor" in the immediately previous indoor specification, the notification determiner 600 determines the notification execution. Then, when it is specified that the user 9 is stopping in the stopping-movement specification and the location of the user 9 is not determined to be "indoor" in the immediately previous indoor specification, the notification determiner 600 determines the notification execution.

As described above, the notification determiner 600 determines whether or not the electronic apparatus 10 transmits the notification outside based on the result of the indoor specification, thus a possibility that the electronic apparatus 10 transmits the notification, which is not so much necessary, outside can be reduced. Thus, convenience of the electronic apparatus 10 is increased.

In the examples in FIGS. 12, 13, and 15, for example, the notification determiner 600 performs the determination processing when the electronic apparatus 10 is located in the predetermined region, and does not perform the determination processing when the electronic apparatus 10 is not located in the predetermined region, thus the electronic apparatus 10 can determine whether or not the electronic apparatus 10 transmits the notification outside when necessary.

In the examples described above, the operation of the electronic apparatus 10 has been described based on the premise that the electronic apparatus 10 is used in the ITS; however, the usage of the electronic apparatus 10 is not limited thereto. The electronic apparatus 10 can be used for any purpose as long as the electronic apparatus 10 is used to meet a necessity to specify that the user 9 is indoors.

OTHER EXAMPLES

Next, other examples of the electronic apparatus 10 will be described.

First Example

Figure 16:
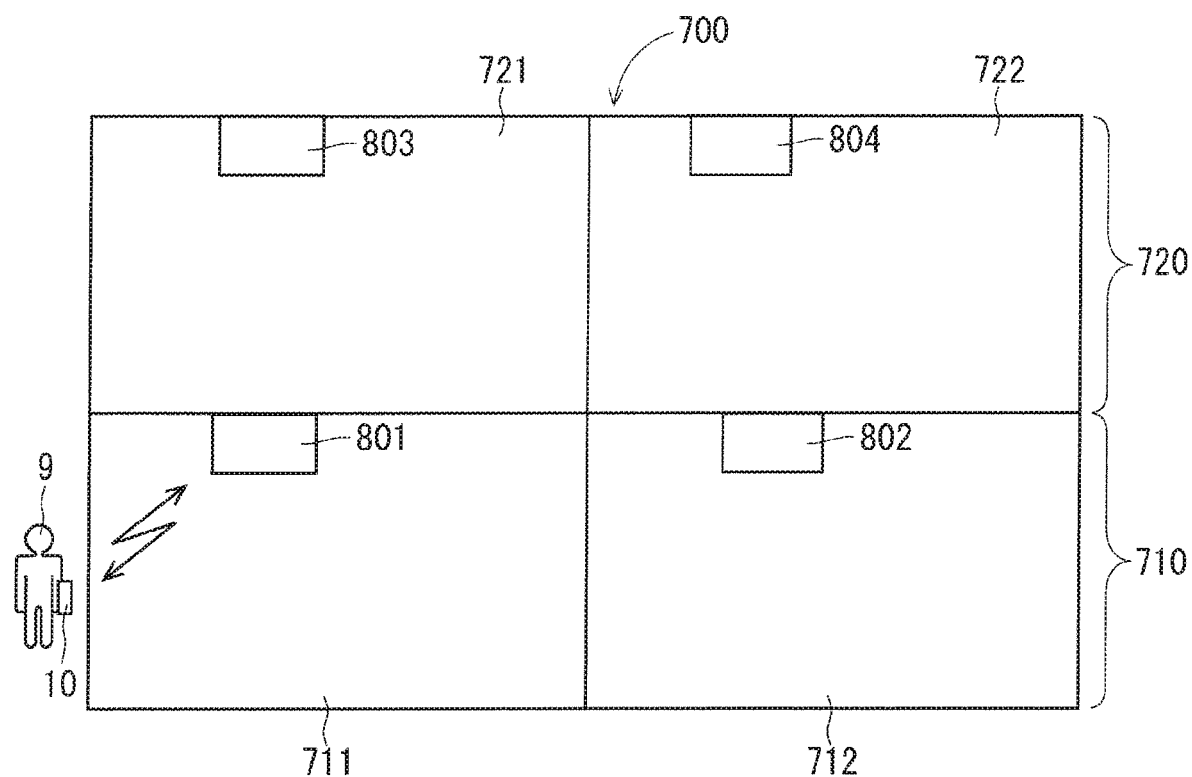
FIG. 16 is a view illustrating one example of a state in which the user having the electronic apparatus is outdoors.

Even when the user 9 is outside the building 700 illustrated in FIG. 7 described above, the electronic apparatus 10 is sometimes capable of receiving a network name from an access point in the building 700. Accordingly, there is a possibility that it is determined as "indoor" by indoor specification although the user 9 is not indoors. FIG. 16 illustrates how the electronic apparatus 10 carried by the user 9 who is outside the building 700 can receive the network name from the access point 801 in the building 700. In the example illustrated in FIG. 16, since the network name received by the electronic apparatus 10 from the access point 801 agrees with the registered network name, it is erroneously determined by indoor specification that the user 9 is indoors.

On the other hand, in the case where the user 9 is in the building 700, there is a high possibility that a received signal strength at the time when the electronic apparatus 10 receives the network name increases, as compared with the case where the user 9 is outside the building 700.

Figure 17:
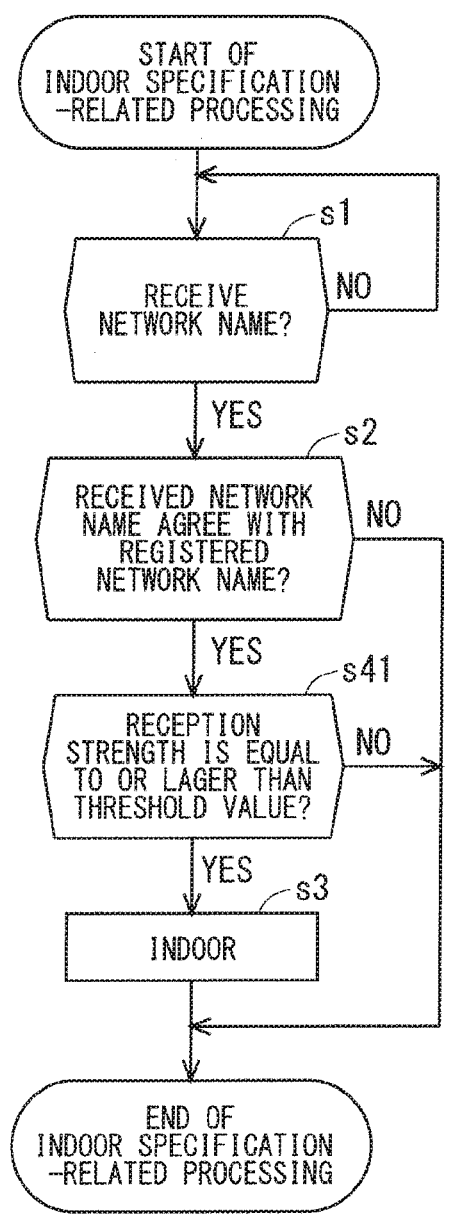
FIG. 17 is a flowchart illustrating one example of operation of the electronic apparatus.

In this example, hence, the indoor specifying unit 420 performs indoor specification, based on a received signal strength of a received network name in addition to a result of determination h the identification information determiner 500. FIG. 17 is a flowchart illustrating one example of indoor specification-related processing according to this example.

As illustrated in FIG. 17, the controller 100 executes Steps s1 and s2 described above. When it is determined in Step s2 that a received network name agrees with a registered network name, in Step s41, the indoor specifying unit 420 determines whether a received signal strength of the received network name received in Step s1 is equal to or larger than a threshold value.

The wireless communication unit 110 is capable of obtaining a received signal strength of a signal received by the wireless communication unit 110. The received signal strength to be obtained by the wireless communication unit 110 may be, for example, a received signal strength indicator (RSSI). The indoor specifying unit 420 determines whether the received signal strength of the reception signal including the received network name, that is, the received signal strength of the received network name, the received signal strength being obtained by the wireless communication unit 110, is equal to or larger than the threshold value.

When it is determined in Step s41 that the received signal strength of the received network name is less than the threshold value, that is, when it is determined in Step s41 that the received signal strength of the received network name is low, the indoor specification-related processing ends. On the other hand, when it is determined that the received signal strength of the received network name is equal to or larger than the threshold value, that is, when it is determined that the received signal strength of the received network name is high, Step s3 is executed to determine that the user 9 is indoors. Thereafter, the indoor specification-related processing ends. In a case where a network name from an access point in a certain building is received by the electronic apparatus 10 carried by the user 9 who is in the building, there is a high possibility that a received signal strength of the network name increases. On the other hand, in a case where a network name from an access point in a certain building is received by the electronic apparatus 10 carried by the user 9 who is outside the building, there is a high possibility that a received signal strength of the network name decreases. It is therefore possible to more correctly perform the indoor specification in such a manner that it is determined that the user 9 is indoors in a case where a received network name agrees with a registered network name and a received signal strength of the received network name is high.

It may be determined in Step s41 whether the received signal strength of the received network name is higher than the threshold value. In this case, when the received signal strength of the received network name is not more than the threshold value, the indoor specification-related processing ends. When the received signal strength of the received network name is higher than the threshold value, it is determined as "indoor" in Step s3.

In addition, the threshold value used in Step s41 may be determined based on a received signal strength of a network name to be registered in the electronic apparatus 10 in receiving the network name, or may be determined based on other criteria.

As described above, in this example, the indoor specifying unit 420 performs the indoor specification, based on the result of determination by the identification information determiner 500 and the received signal strength of the received network name. It is therefore possible to more correctly specify that the user 9 is indoors.

Second Example

Since the contents of a network name are changeable, there is a possibility that a network name, which is registered as a registered network name, of an indoor access point incidentally agrees with a network name of an outdoor access point. Therefore, there is a possibility that a received network name agrees with a registered network name even in a case where the user 9 is outdoors. Consequently, there is a possibility that it is erroneously determined by indoor specification that the user 9 is indoors.

On the other hand, there is a high possibility that a position of an access point in a certain building is close to a position of another access point in the building and is far from a position of another access point outside the building. Accordingly, there is a high possibility that a position of the electronic apparatus 10 at a time of receiving a network name from an access point in a certain building is close to a position of the electronic apparatus 10 at a time of receiving a network name from another access point in the building, and is far from a position of the electronic apparatus 10 at a time of receiving a network name from another access point outside the building.

In this example, hence, it is specified that the user 9 is indoors, using positional information indicating a position of the electronic apparatus 10 at a time of receiving a network name, in addition to a result of determination by the identification information determiner 500. Hereinafter, this example will be described in detail.

In this example, positional information indicating a position of the electronic apparatus 10 at the time when the wireless communication unit 110 receives a network name to be registered in the electronic apparatus 10 is registered as registered positional information in the storage 103. For example, in Step s12 of FIG. 8 described above, positional information to be acquired by the receiver 140 at the time when the operation unit 210 accepts a registration instruction operation is registered as registered positional information in the storage 103. In addition, in a case where registration processing illustrated in FIGS. 9 to 11 described above is executed, for example, positional information to be acquired by the receiver 140 upon execution of Step s23 is registered as registered positional information in the storage 103. For example, in a case where the network name from the access point 803 illustrated in FIG. 7 described above is registered in the storage 103, registered positional information indicates a position of the electronic apparatus 10 in the room 721, that is, a position of the user 9 in the room 721.

In this example, registered positional information in the storage 103 is compared with positional information indicating a position of the electronic apparatus 10 at the time when the wireless communication unit 110 receives a network name. It is specified that the user 9 is indoors, based on the result of comparison.

Figure 18:
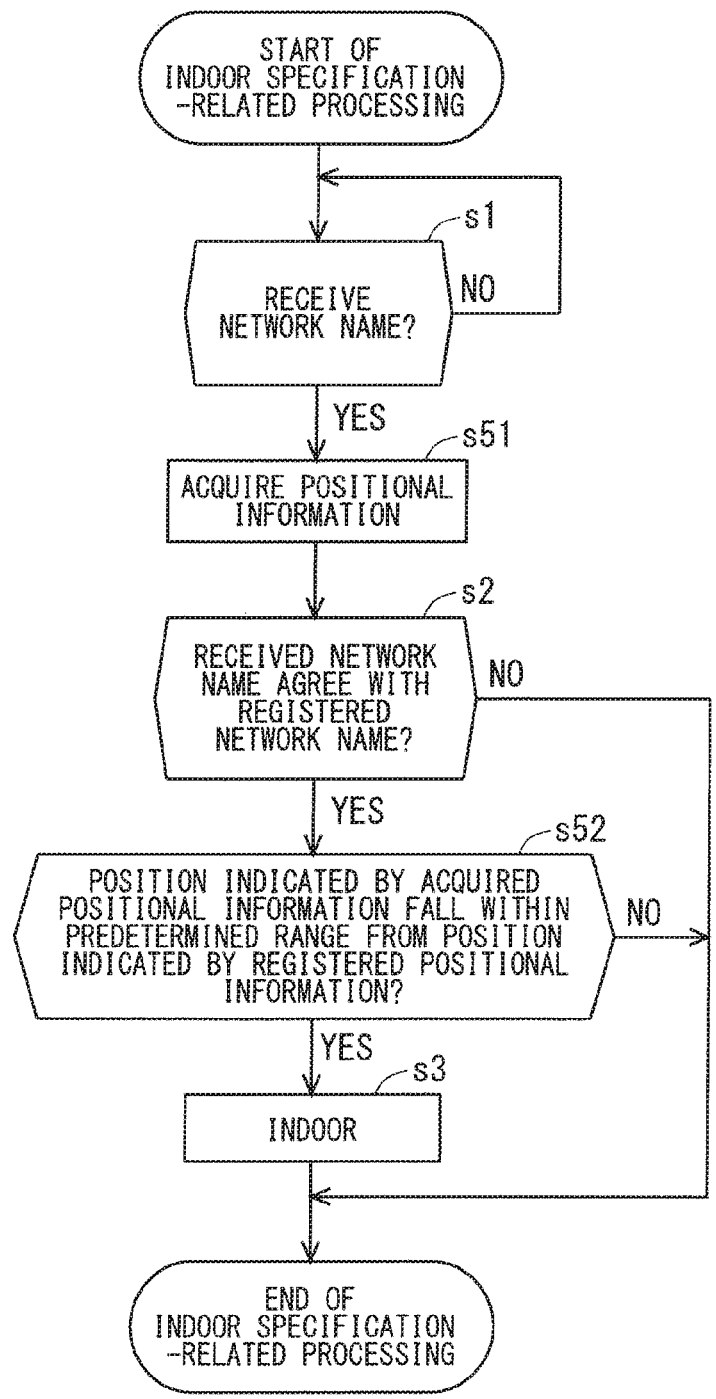
FIG. 18 is a flowchart illustrating one example of operation of the electronic apparatus.

FIG. 18 is a flowchart illustrating one example of indoor specification-related processing according to this example. As illustrated in FIG. 18, the controller 100 executes Step s1 described above. When it is determined in Step s1 that a network name is received, in Step s51, the controller 100 acquires latest positional information from the receiver 140. It can be said that the positional information is positional information indicating a position of the electronic apparatus 10 at the time of receiving the network name received in Step s1.

The controller 100 executes Step s2 subsequently to Step s51. When it is determined in Step s2 that the received network name agrees with a registered network name, in Step s52, the position determiner 430 determines whether the position indicated by the positional information acquired in Step s51 falls within a predetermined range from a position indicated by registered positional information in the storage 103. In other words, the position determiner 430 determines whether the position indicated by the positional information acquired in Step s51 is close to the position indicated by the registered positional information in the storage 103. The predetermined range in Step s52 is set at, for example, about several meters to 10 m.

When it is determined in Step s52 that the position indicated by the positional information acquired in Step s51 does not fall within the predetermined range from the position indicated by the registered positional information in the storage 103, the indoor specification-related processing ends. On the other hand, when it is determined that the position indicated by the positional information acquired in Step s51 falls within the predetermined range from the position indicated by the registered positional information in the storage 103, Step s3 is executed to determine that the user 9 is indoors.

As described above, in this example, even in a case where a received network name agrees with a registered network name, if a position of the electronic apparatus 10 at the time of receiving the received network name is far from a position of the electronic apparatus 10 at the time of receiving the registered network name, it is not determined that the user 9 is indoors. It is therefore possible to reduce a possibility that it is erroneously determined that the user 9 is indoors even in a case where a network name, which is registered as a registered network name, of an indoor access point incidentally agrees with a network name of an outdoor access point located away from the indoor access point.

Figure 19:
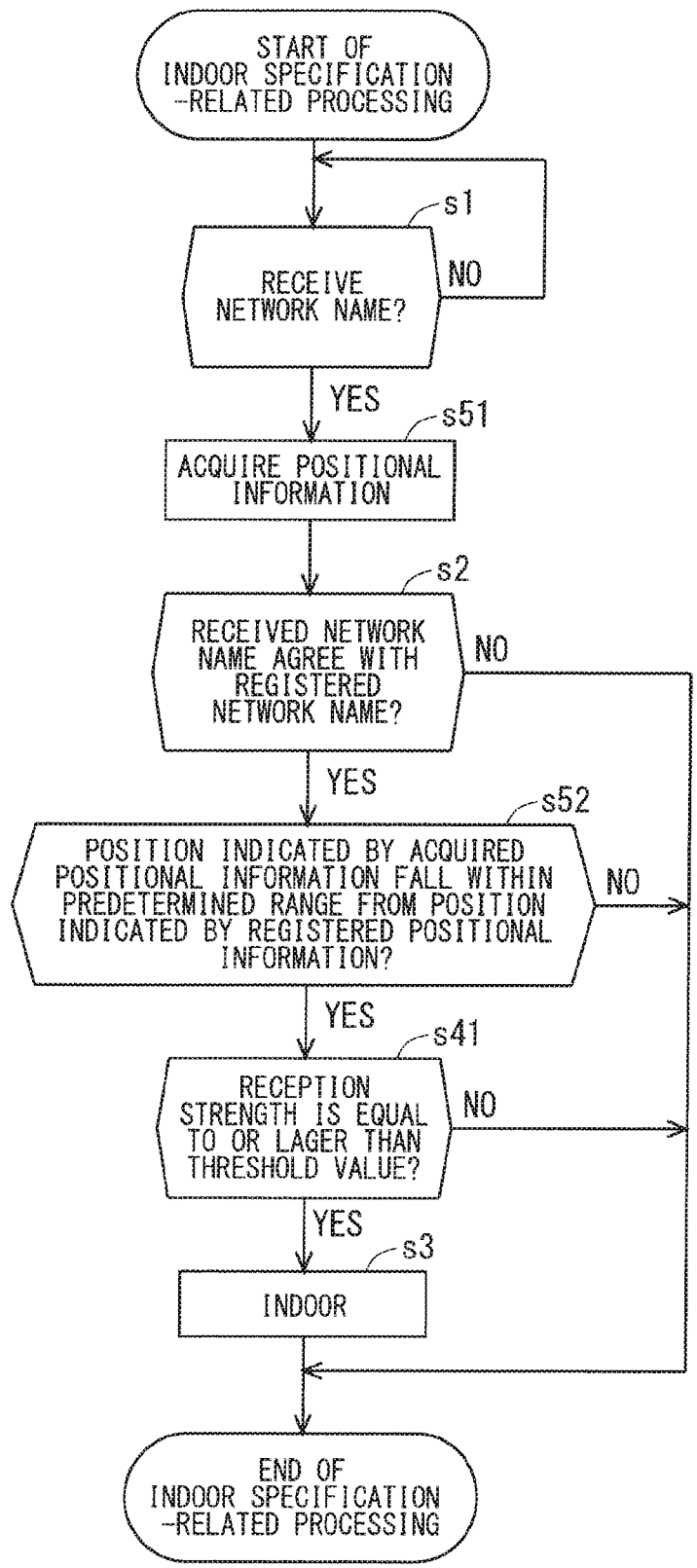
FIG. 19 is a flowchart illustrating one example of operation of the electronic apparatus.

As illustrated in FIG. 19, Step s41 described above may be executed subsequently to Step s52. In this case, Step s41 is executed when it is determined in Step s52 that a position indicated by positional information acquired in Step s51 falls within a predetermined range from a position indicated by registered positional information in the storage 103. When it is determined in Step s41 that a received signal strength of a received network name received in Step s1 is equal to or larger than a threshold value, Step s3 is executed to make a determination as "indoor". In the flowchart illustrated in FIG. 19, Step s52 may be executed subsequently to Step s41.

As described above, it is possible to more correctly specify that the user 9 is indoors in such a manner that it is determined that the user 9 is indoors in the case where the received network name agrees with the registered network name, the position of the electronic apparatus 10 at the time of receiving the received network name is close to the position of the electronic apparatus 10 at the time of receiving the registered network name, and the received signal strength of the received network name is high.

Alternatively, the registered positional information may be positional information indicating a position of an access point that transmits a network name to be registered. In this case, for example, in a case where the network name from the access point 803 illustrated in FIG. 7 described above is registered in the storage 103, the registered positional information indicates the position of the access point 803.

In the presence of a server device having a database in which an access point and positional information indicating a position of the access point are registered in association with each other, the electronic apparatus 10 is capable of acquiring, from the server device, positional information indicating a position of an access point that transmits a network name to be registered. For example, when the operation unit 210 accepts a registration instruction operation in Step s12 of FIG. 8 described above, the electronic apparatus 10 acquires, from the server device, positional information indicating a position of an access point that transmits a network name to be registered, the network name being designated by the registration instruction operation. In addition, in a case where registration processing illustrated in FIGS. 9 to 11 described above is executed, the electronic apparatus 10 acquires, from the server device, the positional information indicating the position of the access point that transmits the network name to be registered, upon execution of, for example, Step s23.

In a case where an access point transmits a network name and positional information indicating a position of the access point, upon reception of a network name to be registered, the electronic apparatus 10 is capable of acquiring the positional information indicating the position of the access point that transmits the network name.

The positional information acquired in Step s51 may be positional information indicating a position of an access point that transmits a received network name. In the presence of the server device having the database, the electronic apparatus 10 is capable of acquiring, from the server device, the positional information indicating the position of the access point that transmits the received network name. In a case where an access point transmits a network name and positional information indicating a position of the access point, upon reception of a received network name, the electronic apparatus 10 is capable of acquiring the positional information indicating the position of the access point that transmits the received network name.

It should be noted that the registered positional information may be positional information indicating a position of an access point that transmits a network name to be registered, and the positional information acquired in Step s51 may be positional information indicating a position of the electronic apparatus 10 at the time of receiving a received network name. The registered positional information may be positional information indicating a position of the electronic apparatus 10 at the time of receiving a network name to be registered, and the positional information acquired in Step s51 may be positional information indicating a position of an access point that transmits a received network name. Since the position of the access point is close to the position of the electronic apparatus 10 that receives the network name from the access point, the kind of the registered positional information may be different from the kind of the positional information acquired in Step s51 as described above.

Third Example

As described above, even in a case where the user 9 is outdoors, the electronic apparatus 10 is sometimes capable of receiving a network name from an access point in the building 700. Accordingly, there is a possibility that it is determined as "indoor" by indoor specification although the user 9 is not indoors.

On the other hand, there is a possibility that the user 9 does not carry the electronic apparatus 10, but puts the electronic apparatus 10 on a desk or the like in a case where the user 9 is in a building such as his/her home.

Therefore, the electronic apparatus 10 according to this example determines whether the electronic apparatus 10 is not carried by the user 9, but is put, and then performs indoor specification, based on the result of determination and a result of determination by the identification information determiner 500. Hereinafter, this example will be described in detail.

A state in which the electronic apparatus 10 is stopping includes: a first state in which the electronic apparatus 10 is stopping since the user carrying the electronic apparatus 10 stops; and a second state in which the electronic apparatus 10 is stopping since the electronic apparatus 10 is not carried by the user, but is put on a desk or the like. Hereinafter, the first state will be referred to as a "first stopping state", and the second state will be referred to as a "second stopping state".

Even in the state in which the user stops, the movement of the user seldom comes to a complete stop. Therefore, the position and orientation of the electronic apparatus 10 in the first stopping state slightly change. On the other hand, in a case where the electronic apparatus 10 is not carried by the user, but is put on a desk or the like, the position and orientation of the electronic apparatus 10 seldom change.

In the example described above, the stopping-movement specifying unit 410 determines whether the electronic apparatus 10 is stopping, without particularly distinguishing whether the electronic apparatus 10 is in the first stopping state or in the second stopping state. In this example, the stopping-movement specifying unit 410 is capable of determining whether the electronic apparatus 10 is in the first stopping state or in the second stopping state, in a distinguishable manner.

The stopping-movement specifying unit 410 is capable of determining whether the electronic apparatus 10 is in the first stopping state or in the second stopping state, in a distinguishable manner, based on, for example, a time change pattern of an acceleration detected by the accelerometer 200 (hereinafter, referred to as an acceleration pattern as appropriate).

As described above, the states of changes in position and orientation of the electronic apparatus 10 differ in the case where the electronic apparatus 10 is in the first stopping state and in the case where the electronic apparatus 10 is in the second stopping state. Accordingly, the acceleration pattern in the case where the electronic apparatus 10 is in the first stopping state is different from the acceleration pattern in the case where the electronic apparatus 10 is in the second stopping state.

In this example, the storage 103 stores therein in advance, as a first reference pattern, a time change pattern of an acceleration detected by the accelerometer 200 in the case where the electronic apparatus 10 is in the first stopping state. The storage 103 also stores therein in advance, as a second reference pattern, a time change pattern of an acceleration detected by the accelerometer 200 in the case where the electronic apparatus 10 is in the second stopping state. The stopping-movement specifying unit 410 determines that the electronic apparatus 10 is in the first stopping state, when an acceleration pattern obtained from the result of detection by the accelerometer 200 agrees with the first reference pattern. On the other hand, the stopping-movement specifying unit 410 determines that the electronic apparatus 10 is not in the first stopping state, when the acceleration pattern disagrees with the first reference pattern in addition, the stopping-movement specifying unit 410 determines that the electronic apparatus 10 is in the second stopping state, when the acceleration pattern agrees with the second reference pattern. On the other hand, the stopping-movement specifying unit 410 determines that the electronic apparatus 10 is not in the second stopping state, when the acceleration pattern disagrees with the second reference pattern.

Figure 20:
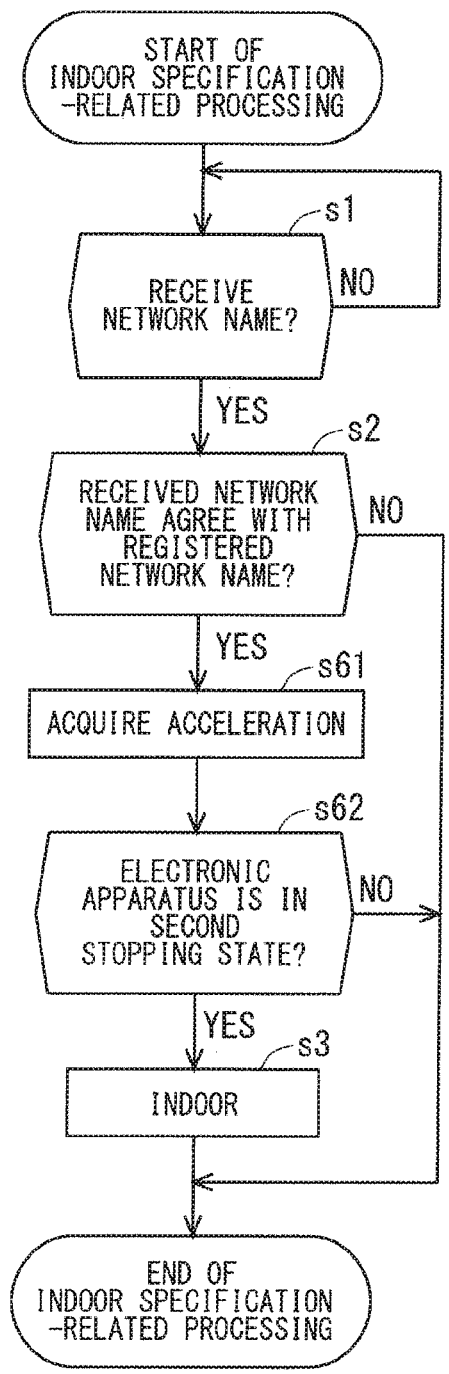
FIG. 20 is a flowchart illustrating one example of operation of the electronic apparatus.

FIG. 20 is a flowchart illustrating one example of indoor specification-related processing according to this example. As illustrated in FIG. 20, the controller 100 executes Steps s1 and s2 described above. When it is determined in Step s2 that a received network name agrees with a registered network name, in Step s61, the stopping-movement specification unit 410 acquires an acceleration from the accelerometer 200. In Step s62, the stopping-movement specifying unit 410 then determines whether the electronic apparatus 10 is brought into the second stopping state within a predetermined period from the reception of the network name in Step s1, based on the acquired acceleration. The stopping-movement specifying unit 410 repeatedly executes state determination processing for determining whether the electronic apparatus 10 is in the second stopping state, within the predetermined period from the reception of the network name in Step s1. When it is determined by the state determination processing that the electronic apparatus 10 is in the second stopping state, the stopping-movement specifying unit 410 determines that the electronic apparatus 10 is brought into second stopping state within a predetermined period from the reception of the network name in Step s1. On the other hand, when it is not determined by the state determination processing executed repeatedly that the electronic apparatus 10 is in the second stopping state even once, the stopping-movement specifying unit 410 determines that the electronic apparatus 10 is not brought into the second stopping state within the predetermined period from the reception of the network name in Step s1.

When it is determined as NO in Step s62, the indoor specification-related processing ends. On the other hand, when it is determined as YES in Step s62, Step s3 is executed to determine that the user 9 is indoors. Thereafter, the indoor specification-related processing ends.

As described above, in this example, the indoor specifying unit 420 performs the indoor specification, based on the result of determination by the identification information determiner 500 and the result of determination as to whether the electronic apparatus 10 is in the second stopping state. It is therefore possible to more correctly specify that the user 9 is indoors. Hereinafter, the processing consisted of Steps s61 and s62 will be referred to as "stopping state determination processing" as appropriate.

As described in this example, in the case where the stopping-movement specifying unit 410 is capable of determining whether the electronic apparatus 10 is in the first stopping state or in the second stopping state, in a distinguishable manner, it may be determined in Step s22 of FIGS. 9 and 11 described above whether the electronic apparatus 10 is in the first stopping state or whether the electronic apparatus 10 is in the second stopping state.

Fourth Example

In a case where the electronic apparatus 10 is electrically charged, there is a high possibility that the user 9 allows the electronic apparatus 10 to be electrically charged in a building such as his/her home.

Therefore, the electronic apparatus 10 according to this example determines whether the electronic apparatus 10 is electrically charged, and performs indoor specification, based on the result of determination and a result of determination by the identification information determiner 500. Hereinafter, this example will be described in detail.

Figure 21:
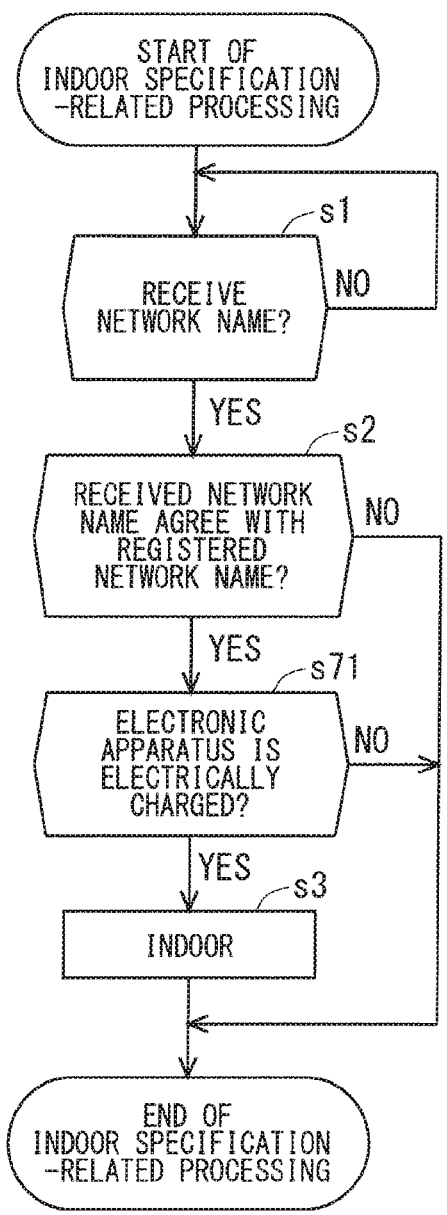
FIG. 21 is a flowchart illustrating one example of operation of the electronic apparatus.

FIG. 21 is a flowchart illustrating one example of indoor specification-related processing according to this example. As illustrated in FIG. 21, the controller 100 executes Steps s1 and s2 described above. When it is determined in Step s2 that a received network name agrees with a registered network name, in Step s71, the controller 100 determines whether the electronic apparatus 10 is electrically charged. In other words, the controller 100 determines whether the battery 230 is electrically charged. The controller 100 is capable of determining whether the battery 230 is electrically charged, by monitoring, for example, a voltage at or a current through a specific terminal of a connector, to which an electric charger is connected, of the electronic apparatus 10.

When it is determined in Step s71 that the electronic apparatus 10 is not electrically charged, the indoor specification-related processing ends. On the other hand, when it is determined in Step s71 that the electronic apparatus 10 is electrically charged, Step s3 is executed to determine that the user 9 is indoors. Thereafter, the indoor specification-related processing ends.

As described above, in this example, the indoor specifying unit 420 performs the indoor specification, based on the result of determination by the identification information determiner 500 and the result of determination as to whether the electronic apparatus 10 is electrically charged. It is therefore possible to more correctly specify that the user 9 is indoors. Hereinafter, the processing of Step s71 will be referred to as "charging determination processing" as appropriate.

Fifth Example

In a building such as the home of the user 9, there is sometimes a home appliance capable of performing wireless communication using a wireless LAN such as Wifi, Bluetooth, or the like. Such a home appliance is sometimes called a smart home appliance. Examples of the smart home appliance may include a television set, a refrigerator, a videogame machine, a rice cooker, a DVD recorder, a vacuum cleaner, a microwave oven, a toaster oven, an electric fan, an air conditioner, an air cleaner, a humidifier, a personal computer, a facsimile, a lighting fixture, and the like.

In a case where the user 9 is in a building such as his/her home, there is a high possibility that the electronic apparatus 10 is capable of receiving information from a smart home appliance in the building.

Therefore, the electronic apparatus 10 according to this example performs indoor specification, based on a result of determination by the identification information determiner 500 and information received from the smart home appliance. Hereinafter, this example will be described in detail.

Figure 22:
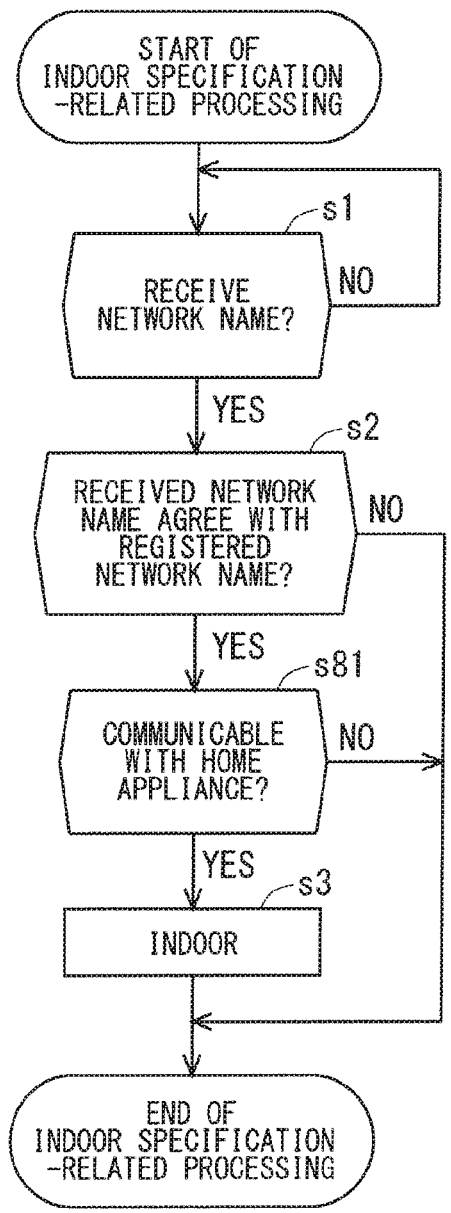
FIG. 22 is a flowchart illustrating one example of operation of the electronic apparatus.

FIG. 22 is a flowchart illustrating one example of indoor specification-related processing according to this example. As illustrated in FIG. 22, the controller 100 executes Steps s1 and s2 described above. When it is determined as YES in Step s2, in Step s81, the indoor specifying unit 420 determines whether the electronic apparatus 10 is communicable with the smart home appliance in the building.

When it is determined in Step s81 that the electronic apparatus 10 is not communicable with the smart home appliance, the indoor specification-related processing ends. On the other hand, when it is determined in Step s81 that the electronic apparatus 10 is communicable with the smart home appliance, Step s3 is executed to determine that the user 9 is indoors. Thereafter, the indoor specification-related processing ends.

The indoor specifying unit 420 is capable of determining whether the electronic apparatus 10 is communicable with the smart home appliance, by various methods. As in a manner similar to that illustrated in FIG. 8 described above, for example, identification information, such as a BSSID or a network name, transmitted by the smart home appliance in the building is registered as registered home appliance identification information in the electronic apparatus 10. When the wireless communication unit 110 receives identification information, in Step s81, the indoor specifying unit 420 determines whether the received identification information agrees with the registered home appliance identification information. When it is determined that the two items of information agree with each other, the indoor specifying unit 420 determines that the electronic apparatus 10 is communicable with the smart home appliance in the building. On the other hand, when it is determined that the two items of information disagree with each other, the indoor specifying unit 420 determines that the electronic apparatus 10 is not communicable with the smart home appliance.

Assumed is a case where there is a smart home appliance that transmits notification information for notifying that the smart home appliance itself is a home appliance, in the building. In this case, when the wireless communication unit 110 receives the notification information, the indoor specifying unit 420 is capable of determining that the electronic apparatus 10 is communicable with the smart home appliance.

In addition, assumed is a case where the electronic apparatus 10 performs communication with a smart home appliance in the building in advance, thereby storing connection information for communication connection to the smart home appliance. In this case, when the electronic apparatus 10 is connected for communication to the smart home appliance, based on the connection information, the indoor specifying unit 420 may determine that the electronic apparatus 10 is communicable with the smart home appliance.

As described above, in this example, the indoor specifying unit 420 performs the indoor specification, based on the result of determination by the identification information determiner 500 and the information received by the wireless communication unit 110 from the home appliance. It is therefore possible to more correctly specify that the user 9 is indoors.

It should be noted that in a case where the electronic apparatus 10 is capable of receiving, from a smart home appliance, power-on information indicating that the smart home appliance is turned on, the power-on information may be used for the indoor specification. For example, in Step s81, the indoor specifying unit 420 determines whether the wireless communication unit 110 receives the power-on information within a predetermined period from a determination as YES in Step s1. In other words, the indoor specifying unit 420 determines whether the wireless communication unit 110 receives the power-on information within a predetermined period from reception of a network name by the electronic apparatus 10. When the indoor specifying unit 420 determines in Step s81 that the wireless communication unit 110 receives the power-on information, then the indoor specifying unit 420 executes Step s3 to make a determination as "indoor". On the other hand, when it is determined in Step s81 that the wireless communication unit 110 does not receive the power-on information, the indoor specification-related processing ends. When the user 9 comes into a building such as his/her home, then the user 9 sometimes turns on power to smart home appliances such as a television set, a videogame machine, and an air conditioner in the building. It is possible to more correctly specify that the user 9 is indoors in such a manner that the electronic apparatus 10 makes the determination as "indoor" upon reception of the power-on information from the smart home appliance after a determination as YES in Step s2.

In addition, in a case where the electronic apparatus 10 is capable of receiving, from a door-equipped smart home appliance, home appliance's door open information indicating that a door of the smart home appliance is opened, the home appliance's door open information may be used for the indoor specification. For example, in Step s81, the indoor specifying unit 420 determines whether the wireless communication unit 110 receives the home appliance's door open information within a predetermined period from the determination as YES in Step s1. When the indoor specifying unit 420 determines in Step s81 that the wireless communication unit 110 receives the home appliance's door open information, then the indoor specifying unit 420 executes Step s3 to make the determination as "indoor". On the other hand, when it is determined in Step s81 that the wireless communication unit 110 does not receive the home appliance's door open information, the indoor specification-related processing ends. When the user 9 comes into a building such as his/her home, then the user 9 sometimes opens doors of door-equipped smart home appliances such as a refrigerator, a microwave oven, and a toaster oven in the building. It is possible to more correctly specify that the user 9 is indoors in such a manner that the electronic apparatus 10 makes the determination as "indoor" upon reception of the home appliance's door open information from the smart home appliance after the determination as YES in Step s2.

In addition, smart home appliances include a smart home appliance provided with a motion sensor that detects a human around the smart home appliance. In Step s81, the indoor specifying unit 420 may determine whether the wireless communication unit 110 receives, from the smart home appliance, detection information indicating that the motion sensor of the smart home appliance detects a human, within a predetermined period from the determination as YES in Step s1. When the indoor specifying unit 420 determines in Step s81 that the wireless communication unit 110 receives the detection information, then the indoor specifying unit 420 executes Step s3 to make the determination as "indoor". On the other hand, when it is determined in Step s81 that the wireless communication unfit 110 does not receive the detection information, the indoor specification-related processing ends. As described above, it is possible to more correctly specify that the user 9 is indoors in such a manner that the electronic apparatus 10 makes the determination as "indoor" upon reception of the detection information from the smart home appliance after the determination as YES in Step s2.

Examples of the motion sensor may include an optical sensor that employs visible rays, infrared rays, or the like, a microwave radar, a millimeter wave radar, an image sensor for cameras, an odor sensor that detects odor components in the atmosphere, a microphone that detects sounds, and the like. The smart home appliance is capable of recognizing the presence of a human around the smart home appliance, based on a value detected by the motion sensor.

In addition, in a case where the smart home appliance is a lighting fixture and the electronic apparatus 10 is capable of receiving, from the lighting fixture, lighting information indicating that a light emitting unit of the lighting fixture lights up, the lighting information may be used for the indoor specification. For example, in Step s81, the indoor specifying unit 420 determines whether the wireless communication unit 110 receives the lighting information within a predetermined period from the determination as YES in Step s1. When the indoor specifying unit 420 determines in Step s81 that the wireless communication unit 110 receives the lighting information, then the indoor specifying unit 420 executes Step s3 to make the determination as "indoor". On the other hand, when it is determined in Step s81 that the wireless communication unit 110 does not receive the lighting information, the indoor specification-related processing ends. There is a high possibility that the user 9 when coming into a building such as his/her home turns on lighting fixtures in the building. It is possible to more correctly specify that the user 9 is indoors in such a manner that the electronic apparatus 10 makes the determination as "indoor" upon reception of the lighting information from the smart home appliance after the determination as YES in Step s2. Hereinafter, the processing of Step s81 will be referred to as "home appliance-related determination processing" as appropriate.

Sixth Example

There is a high possibility that the user 9 when coming into a building such as his/her home unlocks a door of the building.

Therefore, the electronic apparatus 10 according to this example determines whether a door of a building is unlocked, and performs indoor specification, based on the result of determination and a result of determination by the identification information determiner 500. Hereinafter, this example will be described in detail.

Figure 23:
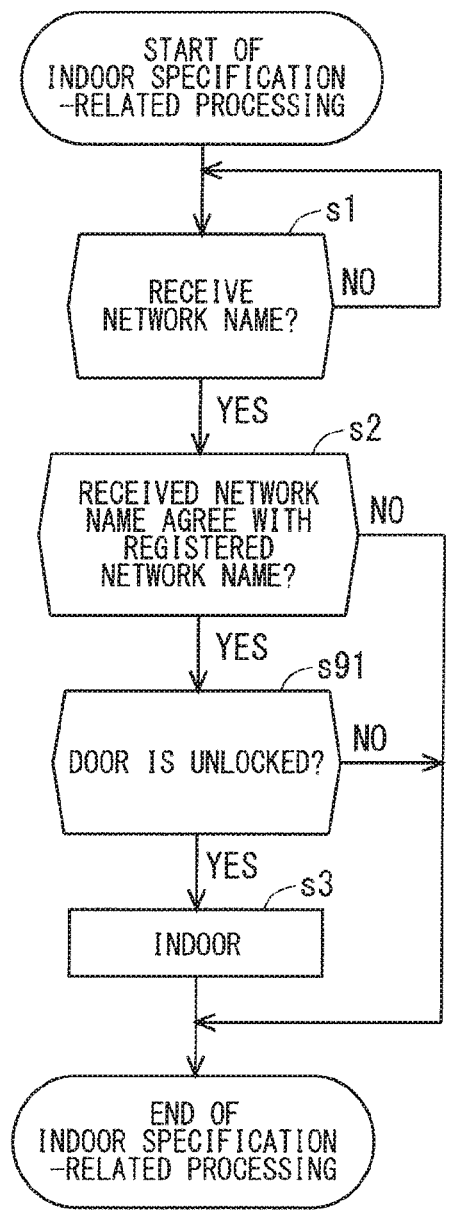
FIG. 23 is a flowchart illustrating one example of operation of the electronic apparatus.

FIG. 23 is a flowchart illustrating one example of indoor specification-related processing according to this example. As illustrated in FIG. 23, the controller 100 executes Steps s1 and s2 described above. When it is determined as YES in Step s2, in Step s91, the controller 100 determines whether the door of the building is unlocked within a predetermined time from a determination as YES in step s1.

In this example, the building is provided a door unlock/lock sensor that detects unlocking and locking of the door. When the door is unlocked, the door unlock/lock sensor is capable of transmitting door unlock information indicating that the door is unlocked. In addition, when the door is locked, the door unlock/lock sensor is capable of transmitting door lock information indicating that the door is locked.

In Step s91, when the wireless communication unit 110 receives the door unlock information within the predetermined time from the determination as YES in Step s1, the controller 100 determines that the door of the building is unlocked within the predetermined time from the determination as YES in Step s1. On the other hand, when the wireless communication unit 110 does not receive the door unlock information within the predetermined time from the determination as YES in Step s1, the controller 100 determines that the door of the building is not unlocked within the predetermined time from the determination as YES in Step s1.

When it is determined in Step s91 that the door of the building is not unlocked, the indoor specification-related processing ends. On the other hand, when it is determined in Step s91 that the door of the building is unlocked, Step s3 is executed to determine that the user 9 is indoors. Thereafter, the indoor specification-related processing ends.

As described above, in this example, the indoor specifying unit 420 performs the indoor specification, based on the result of determination by the identification information determiner 500 and the result of determination as to whether the door of the building is unlocked. It is therefore possible to more correctly specify that the user 9 is indoors. Hereinafter, the processing of Step s91 will be referred to as "door unlock determination processing" as appropriate.

Figure 24:
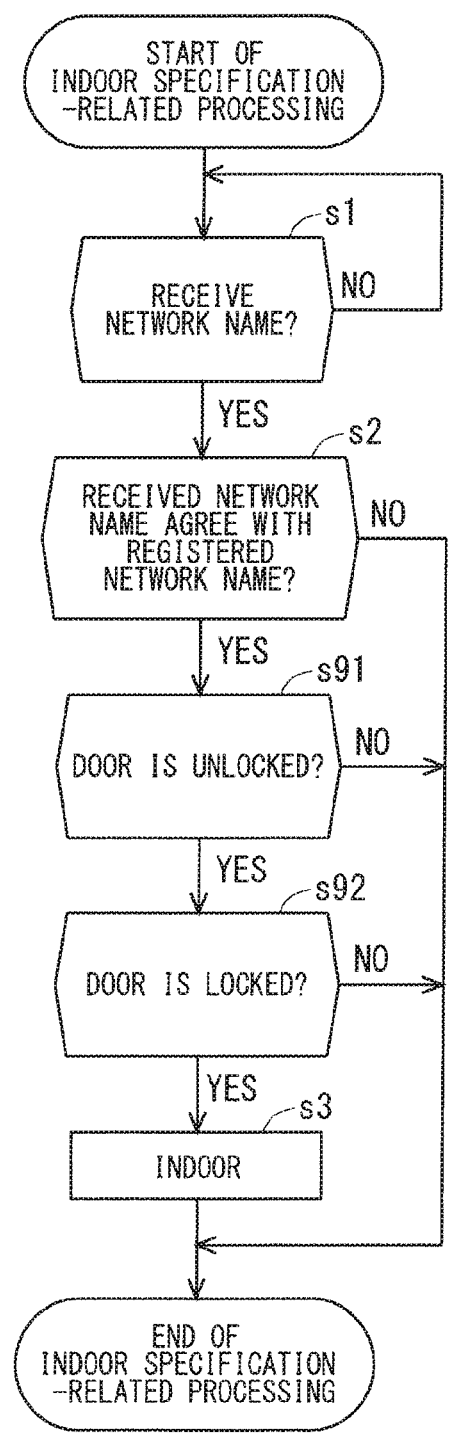
FIG. 24 is a flowchart illustrating one example of operation of the electronic apparatus.

It should be noted that as illustrated in FIG. 24, the controller 100 may determine whether the door of the building is locked within a predetermined time from the determination as YES in Step s91, in Step s92 subsequent to Step s91. In Step s92, when the wireless communication unit 110 receives the door lock information within the predetermined time from the determination as YES in Step s91, the controller 100 determines that the door of the building is locked within the predetermined time from the determination as YES in Step s91. On the other hand, when the wireless communication unit 110 does not receive the door lock information within the predetermined time from the determination as YES in Step s91, the controller 100 determines that the door of the building is not locked within the predetermined time from the determination as YES in Step s91.

When it is determined in Step s92 that the door of the building is not locked, the indoor specification-related processing ends. On the other hand, when it is determined in Step s92 that the door of the building is locked, Step s3 is executed to determine that the user 9 is indoors. Thereafter, the indoor specification-related processing ends.

There is a high possibility that the user 9 when coming into a building such as his/her home unlocks a door of the building, and then locks the door. It is therefore possible to more correctly specify that the user 9 is indoors in such a manner that Step s92 is executed subsequently to Step s91. Hereinafter, the processing consisted of Steps s91 and s92 will be referred to as "door unlock/lock determination processing" as appropriate.

Figure 25:
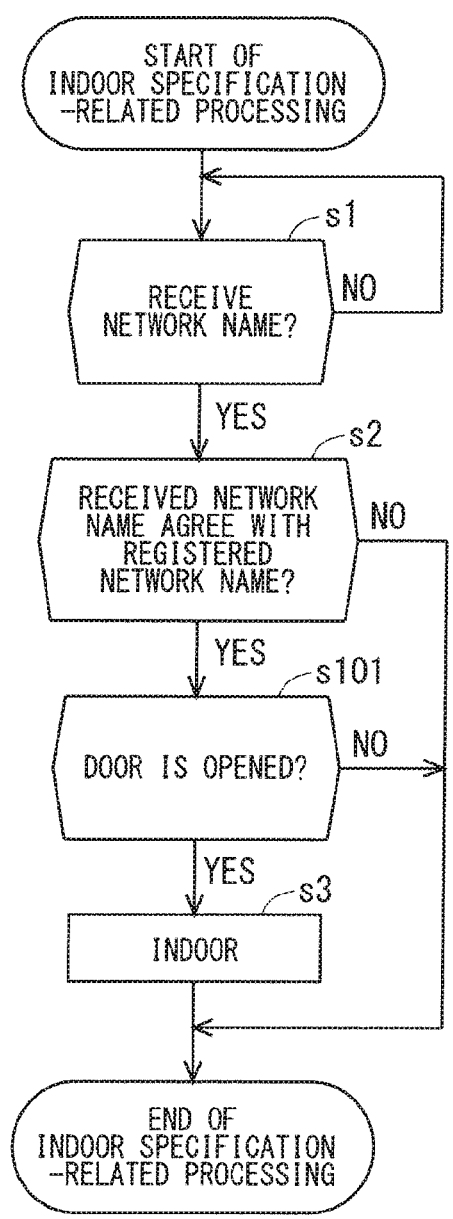
FIG. 25 is a flowchart illustrating one example of operation of the electronic apparatus.

Alternatively, the indoor specifying unit 420 may employ a result of determination as to whether the door of the building is opened, in place of a result of determination as to whether the door of the building is unlocked. FIG. 25 is a flowchart illustrating one example of indoor specification-related processing in this case.

As illustrated in FIG. 25, when it is determined as YES in Step s2, in Step s101, the controller 100 determines whether the door of the building is opened within a predetermined time from a determination as YES in step s1.

In the example illustrated in FIG. 25, the building is provided with a door open/close sensor that detects opening and closing of the door. When the door is opened, the door open/close sensor is capable of transmitting door open information indicating that the door is opened. In addition, when the door is closed, the door open/close sensor is capable of transmitting door close information indicating that the door is closed.

In Step s101, when the wireless communication unit 110 receives the door open information within a predetermined time from the determination as YES in Step s1, the controller 100 determines that the door of the building is opened within the predetermined time from the determination as YES in Step s1. On the other hand, when the wireless communication unit 110 does not receive the door open information within the predetermined time from the determination as YES in Step s1, the controller 100 determines that the door of the building is not opened within the predetermined time from the determination as YES in Step s1.

When it is determined in Step s101 that the door of the building is not opened, the indoor specification-related processing ends. On the other hand, when it is determined in Step s101 that the door of the building is opened, Step s3 is executed to determine that the user 9 is indoors. Thereafter, the indoor specification-related processing ends.

As described above, even in the case where the indoor specifying unit 420 performs the indoor specification, based on the result of determination by the identification information determiner 500 and the result of determination as to whether the door of the building is opened, it is possible to more correctly specify that the user 9 is indoors. Hereinafter, the processing of Step s101 will be referred to as "door open determination processing" as appropriate.

Figure 26:
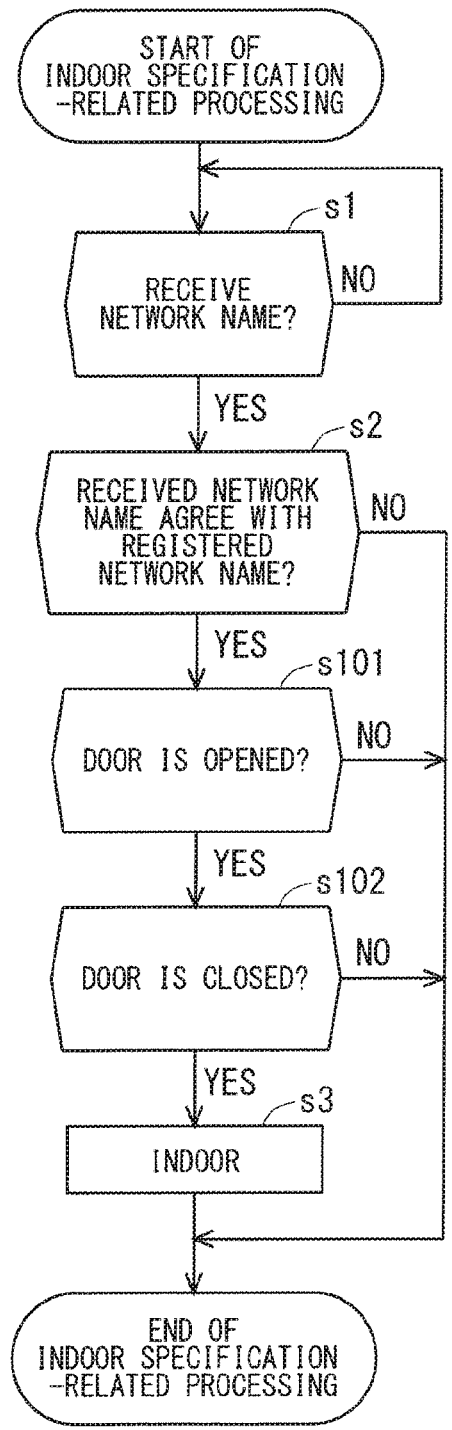
FIG. 26 is a flowchart illustrating one example of operation of the electronic apparatus.

It should be noted that as illustrated in FIG. 26, the controller 100 may determine whether the door of the building is closed within a predetermined time from the determination as YES in Step s101, in Step s102 subsequent to Step s101. In Step s102, when the wireless communication unit 110 receives the door close information within the predetermined time from the determination as YES in Step s101, the controller 100 determines that the door of the building is closed within the predetermined time from the determination as YES in Step s101. On the other hand, when the wireless communication unit 110 does not receive the door close information within the predetermined time from the determination as YES in Step s101, the controller 100 determines that the door of the building is not closed within the predetermined time from the determination as YES in Step s101.

When it is determined in Step s102 that the door of the building is not closed, the indoor specification-related processing ends. On the other hand, when it is determined in Step s102 that the door of the building is closed, Step s3 is executed to determine that the user 9 is indoors. Thereafter, the indoor specification-related processing ends.

As described above, it is possible to more correctly specify that the user 9 is indoors in such a manner that Step s102 is executed subsequently to Step s101. Hereinafter, the processing consisted of Steps s101 and s102 will be referred to as "door open/close determination processing" as appropriate.

Seventh Example

In a case where the user 9 is in a building such as his/her home, there is a high possibility that a temperature in the building is close to a temperature of the electronic apparatus 10.

Therefore, the electronic apparatus 10 in this example compares the temperature of the electronic apparatus 10 with the temperature in the building, and performs indoor specification, based on the result of comparison and a result of determination by the identification information determiner 500. Hereinafter, this example will be described in detail.

Figure 27:
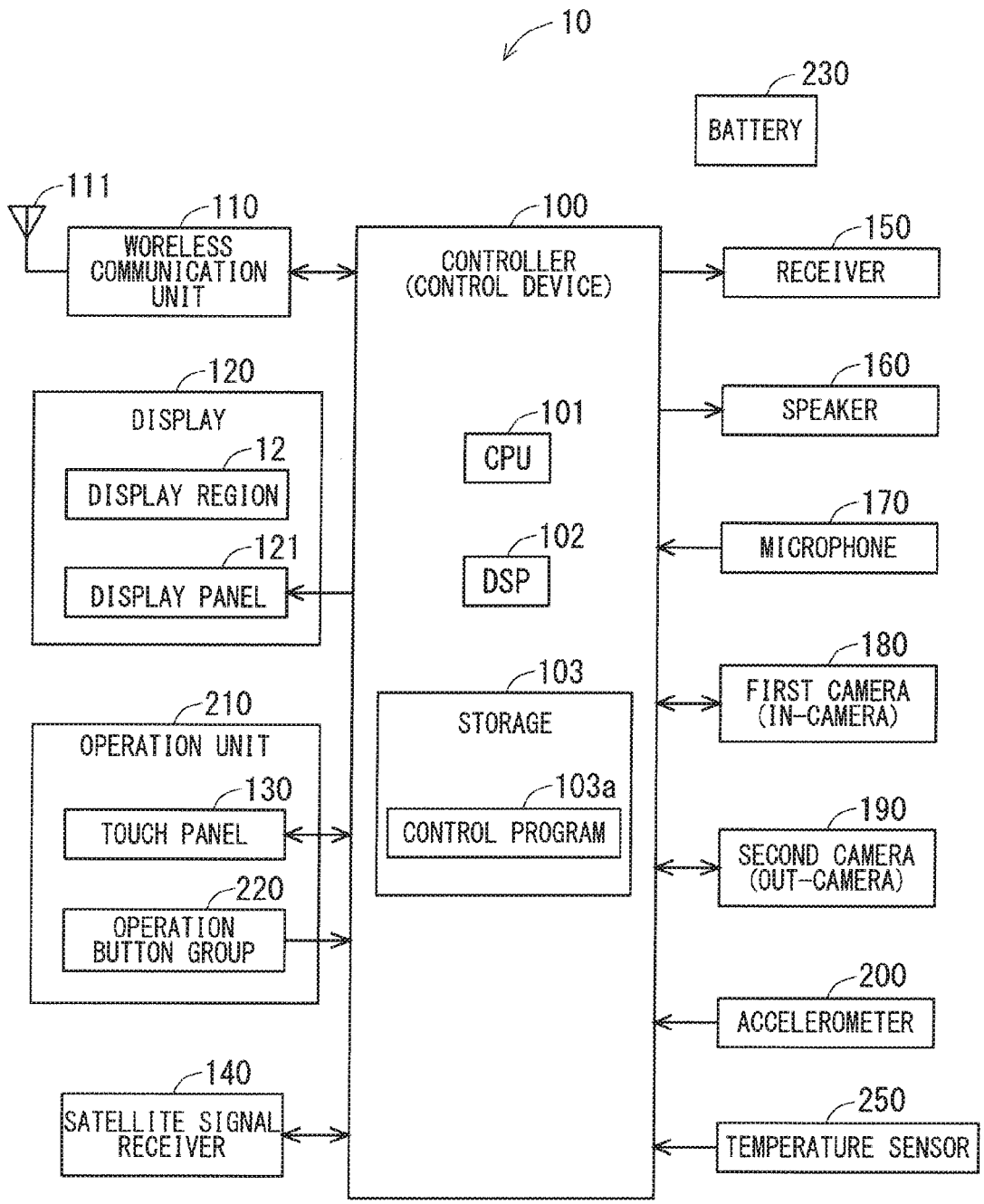
FIG. 27 is a block diagram illustrating one example of a configuration of the electronic apparatus.

FIG. 27 is a diagram illustrating one example of a configuration of the electronic apparatus 10 according to this example. As illustrated in FIG. 27, the electronic apparatus 10 according to this example corresponds to the electronic apparatus 10 illustrated in FIG. 4 described above, the electronic apparatus 10 further including a temperature sensor 250. The temperature sensor 250 is located in, for example, the device case 11. The temperature sensor 250 is capable of detecting the temperature of the electronic apparatus 10.

In this example, a building such as a user's home is provided with an indoor temperature sensor capable of detecting a temperature in the building. The indoor temperature sensor is capable of transmitting the temperature in the building, the temperature being detected thereby. It should be noted that such an indoor temperature sensor may be installed in a smart home appliance such as an air conditioner. Hereinafter, a temperature to be detected by the temperature sensor 250 of the electronic apparatus 10 will be referred to as a "first temperature" as appropriate. In addition, a temperature to be detected by the indoor temperature sensor will be referred to as a "second temperature" as appropriate.

Figure 28:
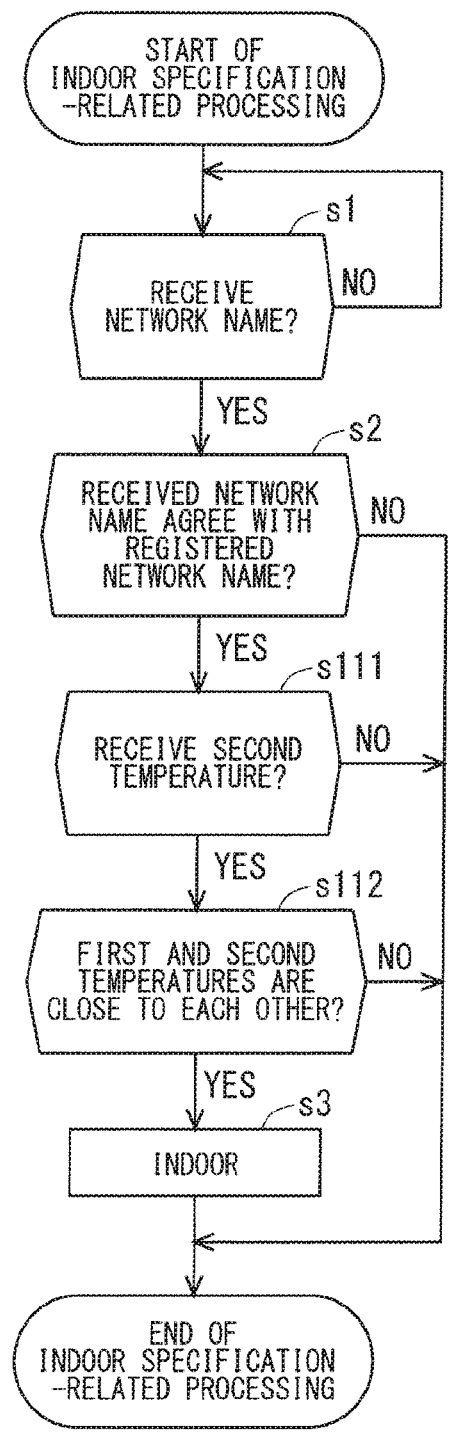
FIG. 28 is a flowchart illustrating one example of operation of the electronic apparatus.

FIG. 28 is a flowchart illustrating one example of indoor specification-related processing according to this example. As illustrated in FIG. 28, the controller 100 executes Steps s1 and s2 described above. When it is determined as YES in Step s2, in Step s111, the controller 100 determines whether the wireless communication unit 110 receives the second temperature within a predetermined time from a determination as YES in Step s1.

When it is determined in Step s111 that the wireless communication unit 110 does not receive the second temperature, the indoor specification-related processing ends. On the other hand, when it is determined in Step s111 that the second temperature is received, in Step s112, the controller 100 determines whether the first temperature detected by the temperature sensor 250 is close to the second temperature received by the wireless communication unit 110. In Step s112, first, the controller 100 calculates an absolute value of a value obtained by subtracting the second temperature from the first temperature. When the calculated absolute value is not more than a threshold value, the controller 100 determines that the first and second temperatures are close to each other. On the other hand, when the calculated absolute value is more than the threshold value, the controller 100 determines that the first and second temperatures are largely different from each other. It should be noted that the controller 100 may determine that the first and second temperatures are close to each other when the calculated absolute value is less than the threshold value, and may determine that the first and second temperatures are largely different from each other when the calculated absolute value is equal to or larger than the threshold value.

When it is determined in Step s112 that the first and second temperatures are largely different from each other, the indoor specification-related processing ends. On the other hand, when it is determined that the first and second temperatures are close to each other, Step s3 is executed to determine that the user 9 is indoors. Thereafter, the indoor specification-related processing ends.

As described above, the indoor specifying unit 420 performs the indoor specification, based on the result of determination by the identification information determiner 500 and the result of comparison between the first and second temperatures. It is therefore possible to more correctly specify that the user 9 is indoors. Hereinafter, the processing consisted of Steps s111 and s112 will be referred to as "temperature determination processing" as appropriate.

Figure 29:
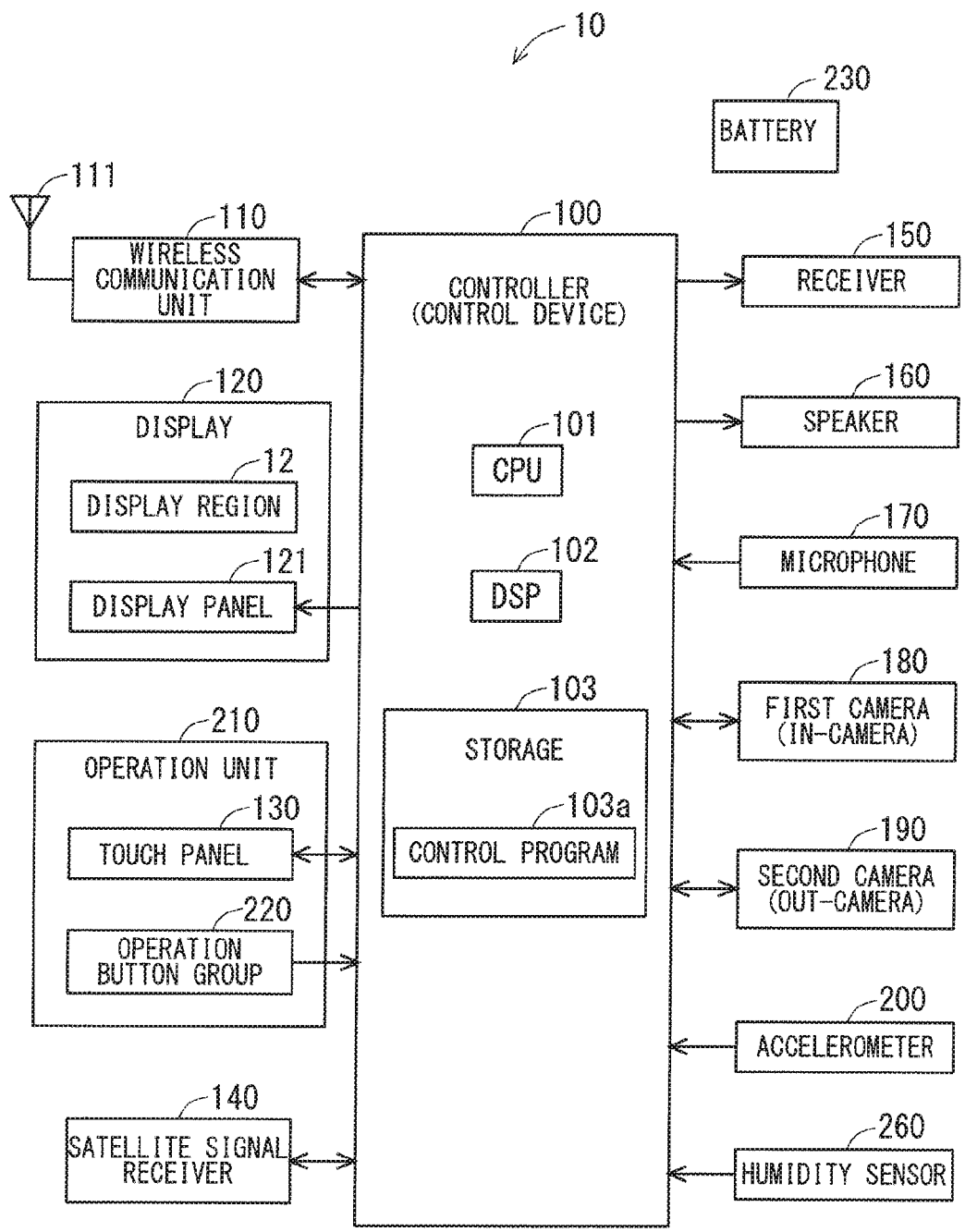
FIG. 29 is a block diagram illustrating one example of a configuration of the electronic apparatus.
Figure 30:
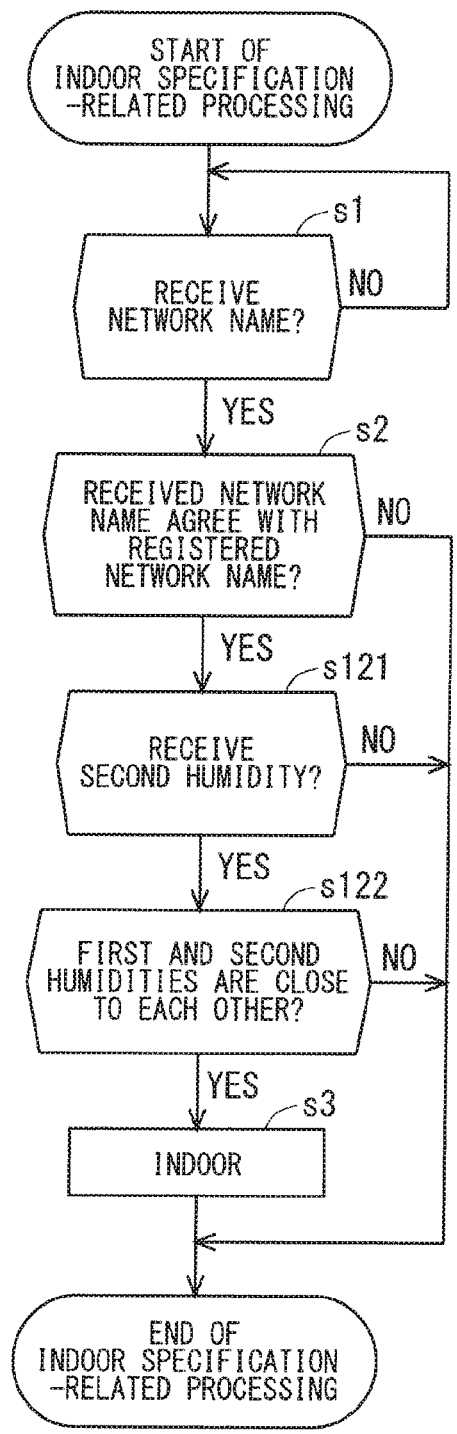
FIG. 30 is a flowchart illustrating one example of operation of the electronic apparatus.

It should be noted that the electronic apparatus 10 may compare a humidity around the electronic apparatus 10 with a humidity in the building, and perform indoor specification, based on the result of comparison and a result of determination by the identification information determiner 500. FIG. 29 is a diagram illustrating one example of a configuration of the electronic apparatus 10 in this case. FIG. 30 is a flowchart illustrating one example of indoor specification-related processing in this case. The electronic apparatus 10 illustrated in FIG. 29 includes a humidity sensor 260 that detects a humidity around the electronic apparatus 10.

In the examples illustrated in FIGS. 29 and 30, a building such as a user's home is provided with an indoor humidity sensor capable of detecting a humidity in the building. The indoor humidity sensor is capable of transmitting the humidity in the building, the humidity being detected thereby. It should be noted that such an indoor humidity sensor may be installed in a smart home appliance such as an air conditioner or a humidifier. Hereinafter, a humidity to be detected by the humidity sensor 260 of the electronic apparatus 10 will be referred to as a "first humidity" as appropriate. In addition, a humidity to be detected by the indoor humidity sensor will be referred to as a "second humidity" as appropriate.

As illustrated in FIG. 30, the controller 100 executes Steps s1 and s2 described above. When it is determined as YES in Step s2, in Step s121, the controller 100 determines whether the wireless communication unit 110 receives the second humidity within a predetermined time from a determination as YES in Step s1.

When it is determined in Step s121 that the wireless communication unit 110 does not receive the second humidity, the indoor specification-related processing ends. On the other hand, when it is determined in Step s121 that the second humidity is received, in Step s122, the controller 100 determines whether the first humidity detected by the humidity sensor 260 is close to the second humidity received by the wireless communication unit 110. In Step s122, first, the controller 100 calculates an absolute value of a value obtained by subtracting the second humidity from the first humidity. When the calculated absolute value is not more than a threshold value, the controller 100 determines that the first and second humidities are close to each other. On the other hand, when the calculated absolute value is more than the threshold value, the controller 100 determines that the first and second humidities are largely different from each other. It should be noted that the controller 100 may determine that the first and second humidities are close to each other when the calculated absolute value is less than the threshold value, and may determine that the first and second humidities are largely different from each other when the calculated absolute value is equal to or larger than the threshold value.

When it is determined in Step s122 that the first and second humidities are largely different from each other, the indoor specification-related processing ends. On the other hand, when it is determined that the first and second humidities are close to each other, Step s3 is executed to determine that the user 9 is indoors. Thereafter, the indoor specification-related processing ends.

As described above, the indoor specifying unit 420 performs the indoor specification, based on the result of determination by the identification information determiner 500 and the result of comparison between the first and second humidities. It is therefore possible to more correctly specify that the user 9 is indoors. Hereinafter, the processing consisted of Steps s121 and s122 will be referred to as "humidity determination processing" as appropriate.

Eighth Example

This example and a ninth example to be described later describe operation of the electronic apparatus 10 based on the premise that the user 9 having the electronic apparatus 10 is a child. In this example and the ninth example, the user 9 will be referred to as a "child 9".

In this example, a network name to be transmitted by an access point in the home of the child 9 is registered as a registered network name in the storage 103 of the electronic apparatus 10. When it is determined as "indoor", that is, when it is determined that the child 9 is at his/her home, the electronic apparatus 10 provides a notification that the child 9 has gone his/her home, to a registered device registered in the electronic apparatus 10. The storage 103 of the electronic apparatus 10 stores therein, for example, an e-mail address allocated to the registered device. In the electronic apparatus 10, when the indoor specifying unit 420 makes a determination as "indoor", the wireless communication unit 110 transmits notification information for notifying that the child 9 has gone his/her home, to the registered device, using the e-mail address in the storage 103. Examples of the registered device may include mobile phones of the parents of the child 9, and mobile phone of the grandparents of the child 9. A plurality of registered devices may be registered in the electronic apparatus 10.

As described above, when the electronic apparatus 10 provides a notification to the outside of the electronic apparatus 10, based on the determination as "indoor", the parents and the like of the child 9 are able to see that the child 9 has gone his/her home even in a case where they are out. The convenience of the electronic apparatus 10 is thus improved. It should be noted that even in a case where the user 9 is not a child, the electronic apparatus 10 may provide a notification to the outside of the electronic apparatus 10, based on the determination as "indoor".

Ninth Example

The operation modes of the electronic apparatus 10 also include a silent mode in which the electronic apparatus 10 outputs no sounds. In a case where the child 9 is at his/her home, when the operation mode of the electronic apparatus 10 is set at the silent mode, there is a possibility that the child 9 does not become aware of contact from the mobile phones of the parents and the like to the electronic apparatus 10.

In this example, hence, a network name to be transmitted by an access point in the home of the child 9 is registered as a registered network name in the storage 103 of the electronic apparatus 10. When the indoor specifying unit 420 makes a determination as "indoor" on condition that the operation mode of the electronic apparatus 10 is set at the silent mode, the electronic apparatus 10 cancels the silent mode. This increases a possibility that when the child 9 carrying the electronic apparatus 10 set at the silent mode goes his/her home, the electronic apparatus 10 cancels the silent mode. Therefore, this improves a possibility that the child 9 who is at his/her home becomes aware of contact (e.g., contact using verbal communication, an e-mail, or the like) from the mobile phones of the parents and the like to the electronic apparatus 10. The convenience of the electronic apparatus 10 is thus improved.

In the example described above, in the flowchart of FIG. 6, when it is determined as YES in Step s2, any one of the is stopping state determination processing (Steps s61 and s62), the charging determination processing (Step s71), the home appliance-related determination processing (Step s81), the door unlock determination processing (Step s91), the door unlock/lock determination processing (Steps s91 and s92), the door open determination processing (Step s101), the door open/close determination processing (Steps s101 and s102), the temperature determination processing (Steps s111 and s112), and the humidity determination processing (Steps s121 and s122) is executed.

In the flowchart of FIG. 6, when it is determined as YES in Step s2, at least two of the is stopping state determination processing, the charging determination processing, the home appliance-related determination processing, the temperature determination processing, and the humidity determination processing may be executed. Also in the flowchart of FIG. 6, at least one of the is stopping state determination processing, the charging determination processing, the home appliance-related determination processing, the temperature determination processing, and the humidity determination processing, and any one of the door unlock determination processing, the door unlock/lock determination processing, the door open determination processing, and the door open/close determination processing may be executed.

In the flowchart of FIG. 17, at least one of the is stopping state determination processing, the charging determination processing, the home appliance-related determination processing, the temperature determination processing, and the humidity determination processing may be executed. In this case, for example, when it is determined as YES in Step s41, the at least one processing is executed. Also in the flowchart of FIG. 17, at least one of the is stopping state determination processing, the charging determination processing, the home appliance-related determination processing, the temperature determination processing, and the humidity determination processing, and any one of the door unlock determination processing, the door unlock/lock determination processing, the door open determination processing, and the door open/close determination processing may be executed. In this case, for example, when it is determined as YES in Step s41, at least one of the is stopping state determination processing, the charging determination processing, the home appliance-related determination processing, the temperature determination processing, and the humidity determination processing, and any one of the door unlock determination processing, the door unlock/lock determination processing, the door open determination processing, and the door open/close determination processing are executed.

In the flowchart of FIG. 18, at least one of the is stopping state determination processing, the charging determination processing, the home appliance-related determination processing, the temperature determination processing, and the humidity determination processing may be executed. In this case, for example, when it is determined as YES in Step s52, the at least one processing is executed. Also in the flowchart of FIG. 18, at least one of the is stopping state determination processing, the charging determination processing, the home appliance-related determination processing, the temperature determination processing, and the humidity determination processing, and any one of the door unlock determination processing, the door unlock/lock determination processing, the door open determination processing, and the door open/close determination processing may be executed. In this case, for example, when it is determined as YES in Step s52, at least one of the is stopping state determination processing, the charging determination processing, the home appliance-related deter ruination processing, the temperature determination processing, and the humidity determination processing, and any one of the door unlock determination processing, the door unlock/lock determination processing, the door open determination processing, and the door open/close determination processing are executed.

In the flowchart of FIG. 19, at least one of the is stopping state determination processing, the charging determination processing, the home appliance-related determination processing, the temperature determination processing, and the humidity determination processing may be executed. In this case, for example, when it is determined as YES in Step s41, the at least one processing is executed. Also in the flowchart of FIG. 19, at least one of the is stopping state determination processing, the charging determination processing, the home appliance-related determination processing, the temperature determination processing, and the humidity determination processing, and any one of the door unlock determination processing, the door unlock/lock determination processing, the door open determination processing, and the door open/close determination processing may be executed. In this case, for example, when it is determined as YES in Step s41, at least one of the is stopping state determination processing, the charging determination processing, the home appliance-related determination processing, the temperature determination processing, and the humidity determination processing, and any one of the door unlock determination processing, the door unlock/lock determination processing, the door open determination processing, and the door open/close determination processing are executed.

Figure 31:
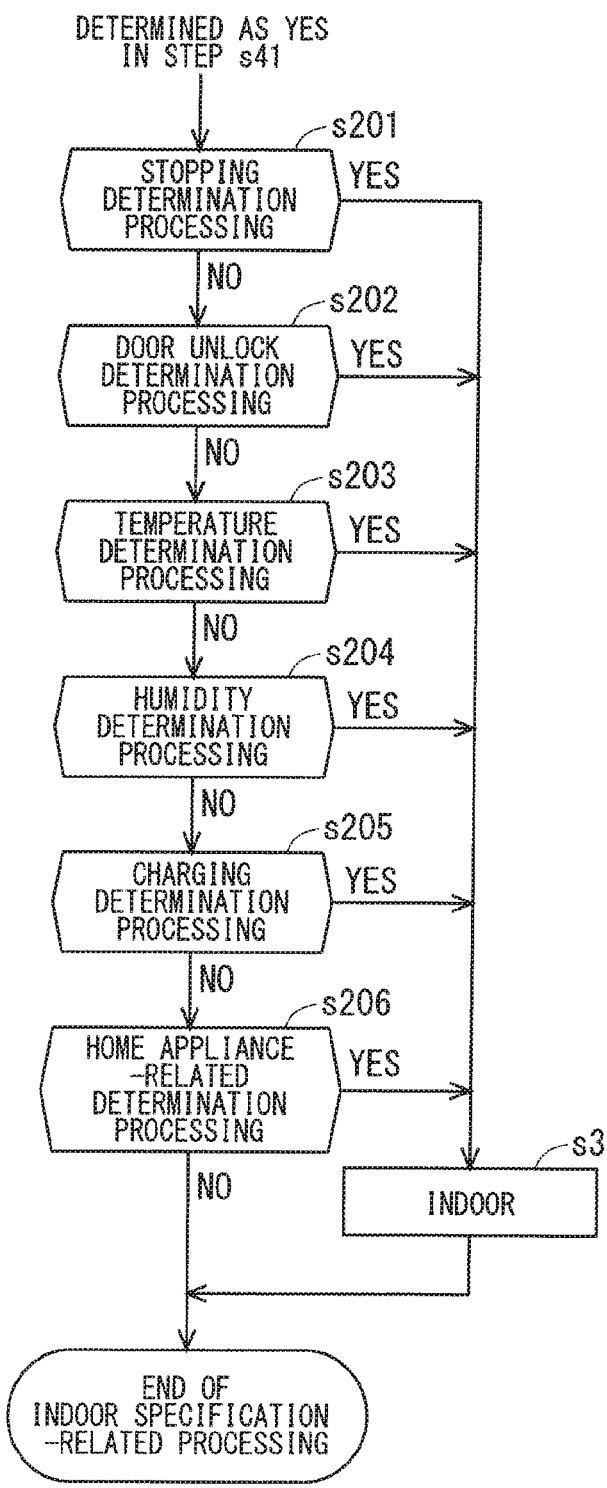
FIG. 31 is a flowchart illustrating one example of operation of the electronic apparatus.

FIG. 31 is a flowchart illustrating one example of indoor specification-related processing in a case where all the is stopping state determination processing, the charging determination processing, the home appliance-related determination processing, the temperature determination processing, and the humidity determination processing, and the door unlock determination processing are executed in the flowchart of FIG. 19. After execution of Step s1, Step s51, Step s2, Step s52, and Step s41 in FIG. 19, when it is determined as YES in Step s41, in Step s201, the controller 100 executes is stopping state determination processing (Steps s61 and s62). When it is determined as YES in Step s62 of the is stopping state determination processing, Step s3 is executed. When Step s3 is executed, the indoor specification-related processing ends. On the other hand, when it is determined as NO in Step s62, the controller 100 executes door unlock determination processing (Step s91) in Step s202.

When it is determined as YES in Step s91 of the door unlock determination processing, Step s3 is executed. On the other hand, when it is determined as NO in Step s91, the controller 100 performs temperature determination processing (Steps s111 and s112) in Step s203. When it is determined as YES in both of Step s111 and Step s112 of the temperature determination processing, Step s3 is executed. On the other hand, when it is determined as NO in one of Step s111 and Step s112 of the temperature determination processing, the controller 100 performs humidity determination processing (Steps s121 and s122) in Step s204.

When it is determined as YES in both of Step s121 and Step s122 of the humidity determination processing, Step s3 is executed. On the other hand, when it is determined as NO in one of Step s121 and Step s122 of the humidity determination processing, the controller 100 performs charging determination processing (Step s71) in Step s205. When it is determined as YES in Step s71 of the charging determination processing, Step s3 is executed. On the other hand, when it is determined as NO in Step s71, the controller 100 performs home appliance-related determination processing (Step s81) in Step s206. When it is determined as YES in Step s81 of the home appliance-related determination processing, Step s3 is executed. On the other hand, when it is determined as NO in Step s81, the indoor specification-related processing ends.

It should be noted that the sequence of Steps s201 to s206 to be executed is not limited to that described above. In addition, at least one of Steps s201 to s206 is not necessarily executed. The door unlock/lock determination processing may be executed in Step s202. In this case, when it is determined as YES in both of Step s91 and Step s92 of the door unlock/lock determination processing, Step s3 is executed. On the other hand, when it is determined as NO in one of Step s91 and Step s92, Step s203 is executed. The door open determination processing may be executed in Step s202. In this case, when it is determined as YES in Step s101 of the door open determination processing, Step s3 is executed. On the other hand, when it is determined as NO in Step s101, Step s203 is executed. The door open determination processing may be executed in Step s202. In this case, when it is determined as YES in both of Step s101 and Step s102 of the door open/close determination processing, Step s3 is executed. On the other hand, when it is determined as NO in one of Step s101 and Step s102, Step s203 is executed.

In the example described above, the network name in the wireless LAN is used for the indoor specification. Alternatively, as in a manner similar to that of the network name, in a case where a communication device with which the wireless communication unit 110 is capable of performing wireless communication transmits identification information whose contents are changeable, the identification information being allocated to the communication device, the indoor specification may also be performed using the identification information in place of the network name.

In the example described above, the network name in the wireless LAN is used for the indoor specification. Alternatively, a BSSID may be used in place of the network name. Also in this case, it is possible to appropriately specify that the user 9 is indoors.

Also in the example described above, the electronic apparatus 10 is a mobile phone such as a smartphone, but may be an electronic apparatus of another kind. Examples of the electronic apparatus 10 may be a tablet terminal, a personal computer, a wearable device, or the like. The wearable device to be employed as the electronic apparatus 10 may be of a type puttable on a wrist, such as a wristband type or a wristwatch type. Alternatively, the wearable device may be of a type puttable on a head, such as a headband type or an eyeglass type. Still alternatively, the wearable device may be of a type puttable on a body, such as a clothing type.

While the electronic apparatus 10 has been described above in detail, the above description is in all aspects illustrative and not restrictive. In addition, various examples described above are applicable in combination as long as they are not mutually inconsistent. It is understood that numerous examples which have not been exemplified can be devised without departing from the scope of the present disclosure.

The invention claimed is:

1. An electronic apparatus comprising:
a transceiver configured to perform wireless communication with a plurality of indoor communication devices to which common first identification information is allocated; and
a storage configured to store, as registered identification information, the first identification information allocated to a first communication device included in the plurality of indoor communication devices; and,
at least one processor configured to perform first determination processing of determining whether received identification information agrees with the registered identification information, the received identification information being the first identification information received by the transceiver from a second communication device included in the plurality of indoor communication devices and allocated to the second communication device and
perform indoor specification to specify that a user having the electronic apparatus is indoors, based on a first result of determination by the first determination processing,
the at least one processor being further configured to control the transceiver to provide a notification to an external device based on a result of the indoor specification and to control the transceiver to refrain from providing the notification to the external device based on a different result of the indoor specification.

2. The electronic apparatus according to claim 1, wherein the at least one processor performs the indoor specification, based on the first result of determination and a received signal strength of the received identification information.

3. The electronic apparatus according to claim 1, wherein the storage stores, as registered positional information, positional information indicating a position of the first communication device or a position of the electronic apparatus at a time when the transceiver receives the registered identification information from the first communication device, and
the at least one processor performs second determination processing of determining whether a position of the second communication device or a position of the electronic apparatus at a time when the transceiver receives the received identification information from the second communication device falls within a predetermined range from the position indicated by the registered positional information, and
performs the indoor specification, based on the first result of determination and a second result of determination by the second determination processing.

4. The electronic apparatus according to claim 1, wherein the electronic apparatus accepts from the user an instruction operation for instructing that the first identification information received by the transceiver is registered as the registered identification information in the storage.

5. The electronic apparatus according to claim 1, wherein the first identification information received by the transceiver in a predetermined time period is registered as the registered identification information in the storage.

6. The electronic apparatus according to claim 1, wherein the at least one processor determines whether the electronic apparatus is stopping, and
the identification information received by the transceiver when it is determined that the electronic apparatus is stopping is registered as the registered identification information in the storage.

7. The electronic apparatus according to claim 1, wherein the at least one processor performs second determination processing of determining whether the electronic apparatus is put without being carried by the user, and
performs the indoor specification, based on the first result of determination and a second result of determination by the second determination processing.

8. The electronic apparatus according to claim 1, wherein the at least one processor performs second determination processing of determining whether the electronic apparatus is electrically charged, and
performs the indoor specification, based on the first result of determination and a second result of determination by the second determination processing.

9. The electronic apparatus according to claim 1, wherein the at least one processor performs the indoor specification, based on the first result of determination and first information received by the transceiver from a home appliance.

10. The electronic apparatus according to claim 9, wherein
the first information includes any one of second identification information allocated to the home appliance, second information indicating that the home appliance is turned on, third information indicating that a door of the home appliance is opened, fourth information indicating that a sensor of the home appliance detects a human, and fifth information indicating that a light emitting unit of the home appliance lights up.

11. The electronic apparatus according to claim 1, wherein
the at least one processor performs second determination processing of determining whether a door of a building is unlocked, and
performs the indoor specification, based on the first result of determination and a second result of determination by the second determination processing.

12. The electronic apparatus according to claim 11, wherein
the at least one processor performs third determination processing of determining whether the door of the building is locked, and
performs the indoor specification, based on the first result of determination, the second result of determination, and a third result of determination by the third determination processing.

13. The electronic apparatus according to claim 1, wherein
the at least one processor performs second determination processing of determining whether a door of a building is opened, and
performs the indoor specification, based on the first result of determination and a second result of determination by the second determination processing.

14. The electronic apparatus according to claim 13, wherein
the at least one processor performs third determination processing of determining whether the door of the building is closed, and
performs the indoor specification, based on the first result of determination, the second result of determination, and a third result of determination by the third determination processing.

15. The electronic apparatus according to claim 1, further comprising:
a temperature detector configured to detect a first temperature that is a temperature of the electronic apparatus, wherein
the at least one processor receives a second temperature in a building through the wireless communication and performs comparison processing of comparing the first temperature with the second temperature, and
performs the indoor specification, based on the first result of determination and a result of comparison by the comparison processing.

16. The electronic apparatus according to claim 1, further comprising:
a humidity detector configured to detect a first humidity that is a humidity around the electronic apparatus, wherein
the at least one processor receives a second humidity in a building through the wireless communication and performs comparison processing of comparing the first humidity with the second humidity, and
performs the indoor specification, based on the first result of determination and a result of comparison by the comparison processing.

17. The electronic apparatus according to claim 1, wherein
when the at least one processor specifies that the user is indoors, the at least one processor provides the notification to an outside of the electronic apparatus.

18. A control device of an electronic apparatus for performing wireless communication,
the control device being configured to control operation of the electronic apparatus, the electronic apparatus being conflicted to perform wireless communication with a plurality of indoor communication devices to which common identification information is allocated, the control device comprising
at least one processor configured to perform determination processing of determining whether registered identification information that is the identification information registered in the electronic apparatus and allocated to a first communication device included in the plurality of indoor communication devices, agrees with received identification information that is the identification information received by the electronic apparatus from a second communication device included in the plurality of indoor communication device through wireless communication and allocated to the second communication device and
perform indoor specification to specify that a user having the electronic apparatus is indoors, based on a result of determination by the determination processing,
wherein the at least one processor is configured to control the electronic apparatus to provide a notification to an external device based on a result of the indoor specification and to control the electronic apparatus to refrain from providing the notification to the external device based on a different result of the indoor specification.

19. An operation method of an electronic apparatus configured to perform wireless communication with a plurality of indoor communication devices to which common identification information is allocated,
the operation method comprising:
determination processing of determining whether registered identification information that is the identification information registered in the electronic apparatus and allocated to a first communication device included in the plurality of indoor communication devices, agrees with received identification information that is the identification information received by the electronic apparatus from a second communication device included in the plurality of indoor communication devices through wireless communication and allocated to the second communication device;
indoor specification to specify that a user having the electronic apparatus is indoors, based on a result of determination in the determination processing; and
determination processing to control the electronic apparatus to provide a notification to an external device based on a result of the indoor specification and to control the electronic apparatus to refrain from providing the notification to the external device based on a different result of the indoor specification.

* * * * *